United States Patent
Horita

(10) Patent No.: US 10,250,779 B2
(45) Date of Patent: Apr. 2, 2019

(54) IMAGE PROCESSING APPARATUS, IMAGE PROCESSING METHOD, AND PROGRAM

(71) Applicant: FUJIFILM Corporation, Tokyo (JP)

(72) Inventor: Shuhei Horita, Tokyo (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 17 days.

(21) Appl. No.: 15/690,463

(22) Filed: Aug. 30, 2017

(65) Prior Publication Data

US 2017/0366709 A1 Dec. 21, 2017

Related U.S. Application Data

(63) Continuation of application No. PCT/JP2016/055705, filed on Feb. 25, 2016.

(30) Foreign Application Priority Data

Mar. 31, 2015 (JP) ................................. 2015-072938

(51) Int. Cl.
*H04N 1/60* (2006.01)
*H04N 1/46* (2006.01)

(52) U.S. Cl.
CPC ............ *H04N 1/6019* (2013.01); *H04N 1/46* (2013.01); *H04N 1/60* (2013.01); *H04N 1/603* (2013.01);
(Continued)

(58) Field of Classification Search
CPC .......... H04N 1/6019; H04N 1/46; H04N 1/60; H04N 1/6005; H04N 1/603; H04N 2201/0082
See application file for complete search history.

(56) References Cited

U.S. PATENT DOCUMENTS

| 2006/0062441 | A1 | 3/2006 | Nishida | |
| 2010/0322300 | A1* | 12/2010 | Li | G06K 9/00234 375/240.01 |
| 2013/0021628 | A1* | 1/2013 | Nakamura | H04N 1/6055 358/1.9 |

FOREIGN PATENT DOCUMENTS

| JP | 2006-094040 A | 4/2006 |
| JP | 2008-008841 A | 1/2008 |

(Continued)

OTHER PUBLICATIONS

International Search Report of PCT/JP2016/055705 dated Mar. 29, 2016.

(Continued)

*Primary Examiner* — Quang N Vo
(74) *Attorney, Agent, or Firm* — Sughrue Mion, PLLC

(57) ABSTRACT

The image processing apparatus (10) includes an image matching unit (14) that performs a process of matching a positional relationship between read image data which is any one of the first read image data (24) and second read image data obtained by color conversion of the first read image data (24) and original document image data (20) of the target printed matter (22); a statistical processing unit (16) that generates statistical information that reflects a distribution of read image signal values of the read image data in each image region of the read image data corresponding to an image region having the same original document image signal values in the original document image data (20); and a mismatching detection unit (18) that detects color mismatching between the original document image data (20) and the target printed matter (22) on the basis of the statistical information.

20 Claims, 16 Drawing Sheets

(52) U.S. Cl.
CPC ... *H04N 1/6005* (2013.01); *H04N 2201/0082* (2013.01)

(56) References Cited

FOREIGN PATENT DOCUMENTS

| | | |
|---|---|---|
| JP | 2011-209105 A | 10/2011 |
| JP | 2013-026693 A | 2/2013 |
| JP | 2013-026921 A | 2/2013 |

OTHER PUBLICATIONS

International Preliminary Report on Patentability with Written Opinion dated Oct. 3, 2017, issued by the International Searching Authority in application No. PCT/JP2016/055705.
Communication dated Feb. 19, 2018 issued by the Japanese Patent Office in counterpart application No. 2015-072938.

\* cited by examiner

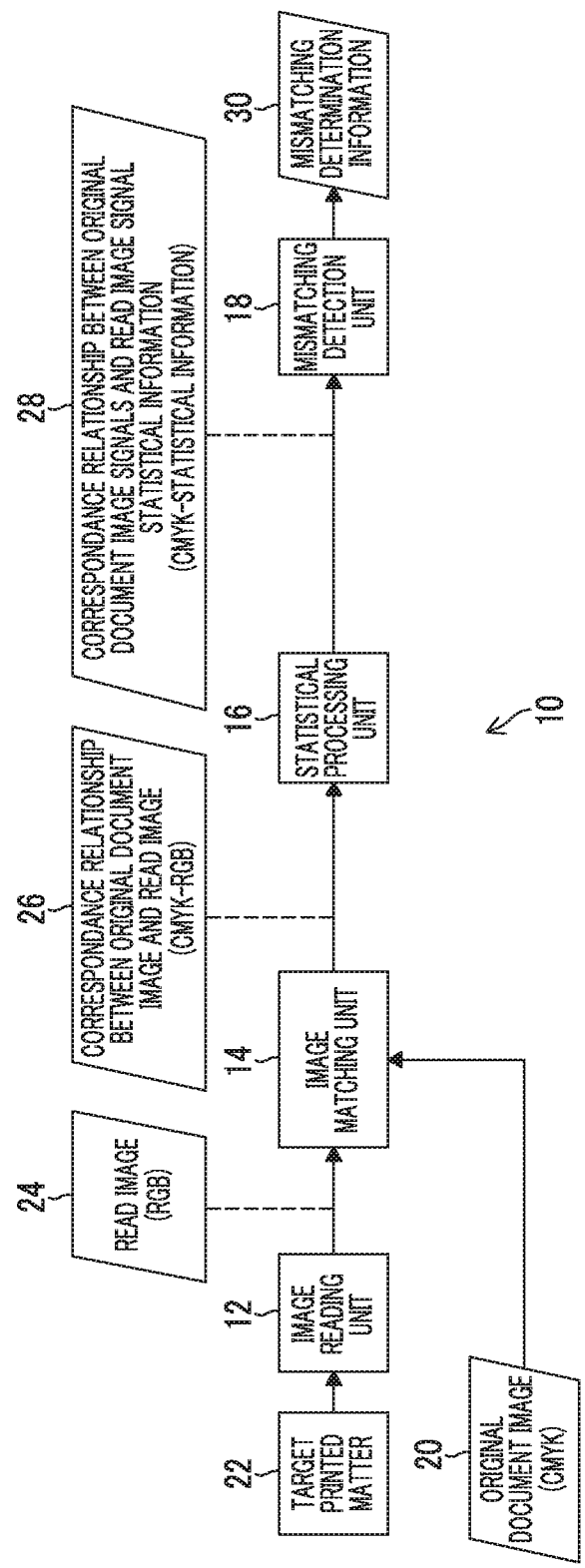

ORIGINAL DOCUMENT IMAGE DATA

TARGET PRINTED MATTER

CORRESPONDANCE DATA BETWEEN ORIGINAL DOCUMENT IMAGE (CM) AND CHROMATICITY VALUES (Lab)

| ID | C | M | Lab |  |
|----|----|----|------------|---|
| 1 | 20 | 90 | 50, 60, −13 | ● |
| 2 | 24 | 66 | 60, 36, −17 | ◉ |
| 3 | 35 | 35 | 71, 9, −20 | ◐ |
| 4 | 47 | 23 | 72, −4, −26 | ◉ |
| 5 | 10 | 15 | 89, 6, −8 | ○ |

IMAGE PROCESSING APPARATUS, IMAGE PROCESSING METHOD, AND PROGRAM

CROSS-REFERENCE TO RELATED APPLICATIONS

This application is a Continuation of PCT International Application No. PCT/JP2016/0 055705 filed on Feb. 25, 2016, which claims priority under 35 U.S.C § 119(a) to Patent Application No. 2015-072938 filed in Japan on Mar. 31, 2015 all of which are hereby expressly incorporated by reference into the present application.

BACKGROUND OF THE INVENTION

1. Field of the Invention

The present invention relates to an image processing apparatus, an image processing method, and a program, and particularly, to an image inspection technology for detecting color mismatching between original document image data and a printed matter.

2. Description of the Related Art

JP2011-209105A discloses a method for comparing an inspection image obtained by imaging a printed image with a reference image created from original document image data used in printing to inspect defects in a printing image. According to the method disclosed in JP2011-209105A, a configuration in which sensitivity correction for increasing or decreasing, with respect to at least one of a reference integrated value distribution obtained by integrating values of pixels disposed in a reference image printing direction or an inspection integrated value distribution obtained by integrating values of pixels disposed in an inspection image printing direction, each integrated value using a predetermined process is performed and the reference integrated value distribution and the inspection integrated value distribution after the sensitivity correction are compared with each other is shown.

Further, a printed matter inspection method disclosed in JP2008-8841A is a method for dividing a master image and a printed matter read image into predetermined areas and detecting defects of a printed matter on the basis of a difference between a density level of an area image of the divided master image and a density level in an area image of a corresponding read image. In the method disclosed in JP2008-8841A, a determination criterion that when image signal values (that is, density levels) of the master image and the printed matter read image are closer to each other, the printed matter is satisfactory (has no defects) is used. Further, JP2008-8841A discloses a method for creating a master image which is a reference of quality determination of a printed matter on the basis of design data (digital data) designed by a computer. The term "design data" in JP2008-8841A corresponds to the "original document image data used in printing" in JP2011-209105A.

SUMMARY OF THE INVENTION

In this specification, image data indicating image content for printing is referred to as "original document image data" or simply an "original document image". The "original document image data used in printing" in JP2011-209105A or the "design data" in JP2008-8841A corresponds to the original document image data. Both methods of JP2011-209105A and JP2008-8841A do not consider that there is an error in the original document image data, and a precondition of inspection is that there is no discordance between the original document image data and a printed matter which is a reproduction target.

However, in a workflow in an actual print task, for example, although original document image data is partially modified in a design process or the like to adjust a target color of a printed matter, a case where original document image data before color adjustment and a target printed matter after color adjustment (printed matter printed on the basis of the original document image data after color adjustment) are delivered to a plate making process and/or a printing process may frequently occur due to artificial mistakes or the like.

In addition, a printing apparatus generally performs an image data color conversion process using a color conversion table such as an international color consortium (ICC) profile to perform desired color reproduction. A color management system (CMS) that uses the ICC profile needs an input profile indicating a target of color reproduction and an output profile indicating color reproduction of the printing apparatus. The profiles to be used in printing are generally created for each printing apparatus on the basis of a color measurement result of a color chart printed out using the printing apparatus.

However, in an actual printing task, there is a case where only original document image data and a target printed matter which is a color sample printed matter are provided from a client or the like and a color of the printed matter needs to match a color of the target printed matter. There is a case where it is not obvious which printing conditions the provided target printed matter is printed under. Namely, a target profile or the like necessary for printing of the original document image data is unknown, and an actual target printed matter becomes a color reproduction target. In such a case, an operator of the plate making process or the printing process manually performs modification of image data or adjustment of printing conditions. Thus, it is necessary for the operator to perform color matching through trial and error, which causes time-consuming.

In consideration of the above-mentioned problems, inventors of the invention have studied a color adjustment technique for creating a target profile corresponding to color reproduction of a target printed matter (color sample printed matter) on the basis of original document image data and a read image of the target printed matter, color-converting an original document image using the created target profile as an input profile, and performing color matching between a printed matter and the target printed matter.

In such a color adjustment technique, in a case where a color conversion table corresponding to a target profile is created on the basis of original document image data and a read image of a target printed matter, it is a precondition that colors of an original document image and the target printed matter match each other, that is, that with respect to a region of the same image signal values in the original document image data, color reproduction on the target printed matter is also almost the same.

However, as described above, in an actual workflow, color mismatching may occur between provided original document image data and a target printed matter. In spite of a region of the same image signal values in an original document image, a color adjustment process including data processing for adjusting image data so that partially different image signal values are obtained by re-touch may be performed through partial correction of the original document image in a design process or the like. Then, there may be a case where the original document image data before color adjustment and the target printed matter after color adjustment are mistakenly delivered to a plate making process and/or a printing process although the target printed matter is output using the original document image data after color adjustment.

In such a case, even in a case where a color conversion table is created from combination of the provided original document image data before color adjustment and the provided target printed matter after color adjustment, the accuracy of color matching is lowered in an area where color mismatching occurs.

In addition, even in a case where a color conversion table is not created, there is a problem in that an adjustment time for matching between a color sample that does not match original document image data and a color of a printed matter is lengthened in a plate making process and/or a printing process and consequently color matching is not sufficiently achieved.

In consideration of the above problems, an object of the invention is to provide an image processing apparatus, an image processing method, and a non-transitory computer readable recording medium storing a program capable of detecting color mismatching between original document image data and a target printed matter and solving at least one problem among the above-described plural problems.

In order to solve the problems, the following aspects are provided.

According to a first aspect of the invention, there is provided an image processing apparatus comprising: an image reading unit that reads a target printed matter to acquire first read image data indicating a read image of the target printed matter; an image matching unit that performs a process of matching a positional relationship between read image data which is any one of the first read image data and second read image data obtained by color conversion of the first read image data and original document image data of the target printed matter; a statistical processing unit that generates statistical information that reflects a distribution of read image signal values of the read image data in each image region of the read image data corresponding to an image region having the same original document image signal values in the original document image data; and a mismatching detection unit that detects color mismatching between the original document image data and the target printed matter on the basis of the statistical information.

Here, the "original document image data of the target printed matter" refers to data of an original document to be printed corresponding to image content of the target printed matter. The target printed matter may be printed from the original document image data, or may be printed from original document image data after color adjustment in which image signal values of the original document image data are partially adjusted (changed). Original document image data before color adjustment which becomes a basis of original document image data after color adjustment also corresponds to the "original document image data of the target printed matter".

In a case where color mismatching between the original document image data and the target printed matter is present, scattering (dispersion of data) of read image signal values in an image region of read image data of the target printed matter corresponding to an image region of the same original document image signal values increases. Using this scattering, it is possible to detect color mismatching between the original document image data and the target printed matter from statistical information that reflects a distribution of the target printed matter read image signal values corresponding to the image region having the same original document image signal values. Thus, it is possible to make a color matching operation of matching a printed matter printed using the original document image data and a color of the target printed matter.

According to a second aspect of the invention, the image processing apparatus according to the first aspect of the invention may further comprise a region classification processing unit that performs a process of classifying respective pixels of the original document image data into groups of pixels having the same original document image signal values on the basis of original document image signal values of the respective pixels of the original document image data to divide the original document image data into image regions having the same original document image signal values.

According to a third aspect of the invention, in the image processing apparatus according to the first or second aspect of the invention, the statistical processing unit may perform a statistical process using a pixel group of the read image data that belongs to the image region of the read image data corresponding to the image region having the same original document image signal values as a population to generate the statistical information of at least one of a statistic indicating scattering of the read image signal values of pixels that belong to the population or a histogram of the read image signal values.

According to a fourth aspect of the invention, the image processing apparatus according to any one of the first to third aspects of the invention may further comprise a color conversion unit that converts, using a first color conversion table indicating a correspondence relationship between read image signal values of the first read image data acquired by the image reading unit and chromaticity values indicated by values in a device non-dependent color space, the read image signal values of the first read image data into the chromaticity values, and the statistical processing unit may generate the statistical information using chromaticity values of the read image color-converted by the color conversion unit as the read image signal values.

According to a fifth aspect of the invention, in the image processing apparatus according to any one of the first to fourth aspects of the invention, the mismatching detection unit may detect a mismatching region between colors of the original document image data and the read image data on the basis of the statistical information.

According to a sixth aspect of the invention, the image processing apparatus according to the fifth aspect of the invention may further comprise an image adjustment unit that adjusts original document image signal values of pixels that belong to the mismatching region in the original document image data on the basis of read image signal values of pixels that belong to the mismatching region of the read image data.

According to a seventh aspect of the invention, in the image processing apparatus according to the sixth aspect of the invention, the image adjustment unit may convert the read image signal values of the pixels that belong to the mismatching region of the read image data into signal values based on a color space of the original document image data, and may calculate the amount of adjustment on the basis of a difference between the signal values obtained by converting the read image signal values of the pixels that belong to the mismatching region into the color space of the original document image data and representative values of signal value groups in the mismatching region.

According to an eighth aspect of the invention, in the image processing apparatus according to the seventh aspect of the invention, the image adjustment unit may add the amount of adjustment to the original document image signal values of the pixels that belong to the mismatching region in the original document image data to calculate original document image signal values after adjustment.

According to a ninth aspect of the invention, the image processing apparatus according to any one of the sixth to eighth aspects of the invention may further comprise a color conversion table creation unit that creates, on the basis of a correspondence relationship between original document image data after adjustment obtained by adjusting the original document image signal values by the image adjustment unit and the second read image data obtained by converting the read image signal values of the first read image data into chromaticity values indicated by values in a device non-dependent color space, a second color conversion table indicating a correspondence relationship between the original document image signal values based on a color space of the original document image data and the chromaticity values.

According to a tenth aspect of the invention, there is provided an image processing method comprising: an image reading step of reading a target printed matter to acquire first read image data indicating a read image of the target printed matter; an image matching step of performing a process of matching a positional relationship between read image data which is the first read image data or second read image data obtained by color conversion of the first read image data and original document image data of the target printed matter; a statistical processing step of generating statistical information that reflects a distribution of read image signal values of the read image data in each image region of the read image data corresponding to an image region having the same original document image signal values in the original document image data; and a mismatching detection step of detecting color mismatching between the original document image data and the target printed matter on the basis of the statistical information.

In the tenth aspect of the invention, the same configurations as the configurations specified in the second to ninth aspects of the invention may be appropriately combined. In this case, means for performing processes or functions specified in an image processing apparatus may be considered as elements of "steps" of processes or functions corresponding thereto.

According to an eleventh aspect of the invention, there is provided a non-transitory computer readable recording medium storing a program that causes a computer to realize: a function of acquiring, using an image reading unit that reads a target printed matter, first read image data indicating a read image of the target printed matter; an image matching function of performing a process of matching a positional relationship between read image data which is the first read image data or second read image data obtained by color conversion of the first read image data and original document image data of the target printed matter; a statistical processing function of generating statistical information that reflects a distribution of read image signal values of the read image data in each image region of the read image data corresponding to an image region having the same original document image signal values in the original document image data; and a mismatching detection function of detecting color mismatching between the original document image data and the target printed matter on the basis of the statistical information.

In the non-transitory computer readable recording medium storing the program of the eleventh aspect of the invention, the same configurations as the configurations specified in the second to ninth aspects of the invention may be appropriately combined. In this case, processing units or functional units which are means for performing processes or functions specified in an image processing apparatus may be considered as elements of "functions" of a program for performing processes or functions corresponding thereto.

According to the invention, it is possible to detect color mismatching between an original document image data and a target printed matter.

BRIEF DESCRIPTION OF THE DRAWINGS

FIG. 2 is a block diagram showing a configuration of an image processing apparatus according to a first embodiment.

DESCRIPTION OF THE PREFERRED EMBODIMENTS

Figure 1A:
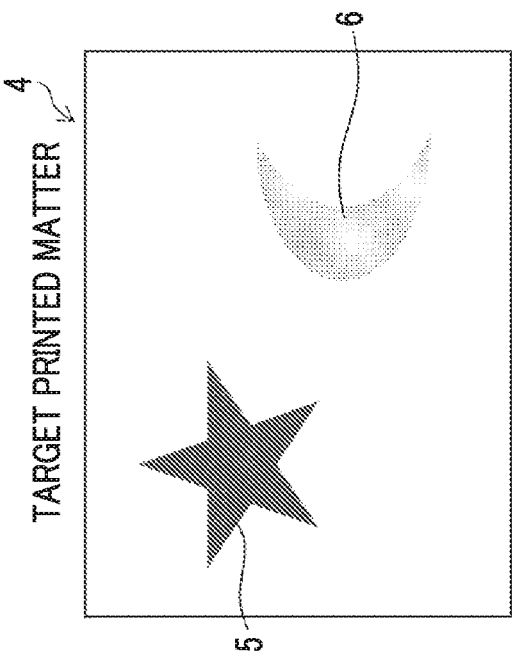
FIG. 1A is a diagram showing an example of an original document image.

Hereinafter, embodiments of the invention will be described with reference to the accompanying drawings.

Terms

First, terms used in the description of the embodiments will be described.

A target printed matter refers to a printed matter which is a color sample of a target color to be reproduced and is given as a color sample printed matter which is an actual thing. Original document image data refers to digital image data indicating image content of a printing original document corresponding to a target printed matter. The original document image data may be data of an entire image indicating entire image content on a printing surface or may be data on an image part (original document part) which is a part of an image recorded on a printing surface.

A data format of the original document image data is not particularly limited. In these embodiments, it is assumed that the original document image data represents CMYK images for which signal values of color components of cyan (C), magenta (M), yellow (Y), and black (K) are determined for each pixel. The CMYK images represent digital images having a C signal value, an M signal value, a Y signal value, and a K signal value for each pixel. It is assumed that signal values of respective color components are indicated by signal values of 8 bits (0 to 255 gradations). Here, the original document image data is not limited to the CMYK images, and for example, may be RGB images, or the like for which signal values of color components of red (R), green (G), and blue (B) are determined for each pixel, or for example, may be a format of combination of the CMYK signals and spot color signals. Further, the gradation (bit number) of the image signal is not limited to this example.

In a case where the original document image data is given by the RGB images, the RGB signals may be converted into CMKY images by a color conversion process of RGB→CMYK conversion.

In these embodiments, the term "original document image" is used as a term indicating "original document image data". That is, the original document image includes a meaning of digital image data indicating image content of a printing original document, which has the same meaning as that of the original document image data.

In these embodiments, an example in which an L*a*b* color system is used as a color system (color coordinate system) of a device non-dependent color space indicating color values is shown, but the device non-dependent color system is not limited thereto. For example, an XYZ color system, a Yxy color system, and an L*u*v* color system regulated by the International Commission on Illumination may be used, or instead, an HSV color system, an HLS color system, a YCbCr color system, or the like may be used. In the XYZ color system, colors are indicated using a stimulus value Y including luminance (brightness) and color stimulus values X and Z. In the Yxy color system, colors are indicated using luminance Y and chromaticity coordinates x and y. In the HSV color system, colors are indicated using hue (H), saturation (S), value (V) or brightness (B). In the HLS color system, colors are indicated using hue (H), saturation (S), and luminance (L). In the YCbCr color system, colors are indicated using luminance Y and color differences Cb and Cr.

In the specification, values of colors indicated by a device non-dependent color system are referred to as "chromaticity values". That is, in this specification, the term "chromaticity values" are not limited to the XYZ color system, and means values of colors indicated by color coordinates in a device non-dependent color space.

In these embodiments, for simplification of description, a color space of the L*a*b* color system is referred to as a "Lab color space", and chromaticity values indicated by coordinate values of the Lab color space are referred to as "Lab values". Further, image data of which image signal values of each pixel are described using the Lab value is referred to as a "Lab image".

<Color Mismatching Between Original Document Image and Target Printed Matter>

Color mismatching between an original document image and a target printed matter means that colors become different on the target printed matter although the same image signal values (CMYK values) are shown on the original document image.

[Specific Example of Mismatching]

An influence of in-plane scattering of printing performed by a printing apparatus corresponds to about color difference 5 at maximum, for example. In an average of general printing apparatuses for the task, the in-plane scattering of printing corresponds to about color difference 1. Such in-plane scattering of printing due to a printing apparatus is referred to as an "allowable color difference". Here, the term "about color difference 5" and the term "about color difference 1" in the above description are merely examples, and the in-plane scattering of printing due to the printing apparatus is not necessarily limited to the above examples.

In an original document image, the same image signal values should be obtained. However, in a case where a sufficiently large color difference compared with the allowable color difference is present on a printed matter, there is a concern that a wrong original document image may be provided. For example, there is a possibility that image signal values of a printing original document are partially adjusted on data in color sample printing in a design process of creating an original document image or intentionally on a client side, but image data before adjustment is mistakenly provided as an original document image in a plate making process and/or a printing process or to a printing company side.

Figure 1B:
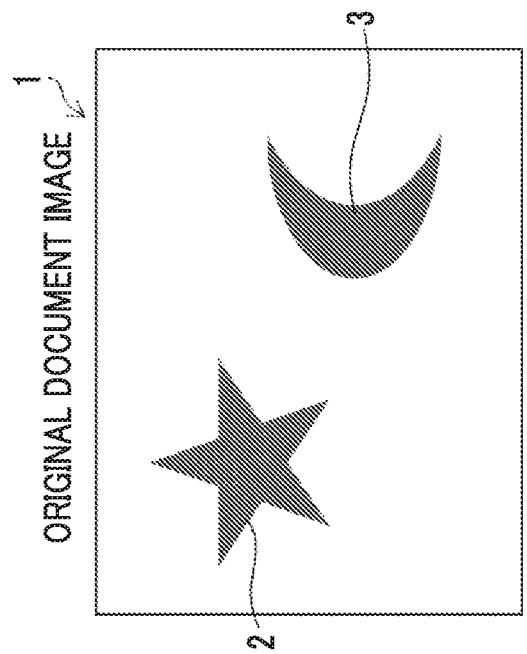
FIG. 1B is a diagram showing an example of a target printed matter.

FIG. 1A is a diagram showing an example of an original document image, and FIG. 1B is a diagram showing an example of a target printed matter. The original document image 1 in FIG. 1A is an original document image of a target printed matter and shows an original document image before adjustment before an image signal value is partially adjusted. The original document image 1 shown in FIG. 1A includes a star-shaped region 2 which is a star-shaped image region and a crescent-shaped region 3 which is a crescent-shaped image region. CMYK values of the star-shaped region 2 and the crescent-shaped region 3 of the original document image 1 are set to have the same image signal values.

A target printed matter 4 shown in FIG. 1B shows a printed matter printed on the basis of an original document image after adjustment (not shown) after an image signal value of the original document image 1 is adjusted. In the original document image after adjustment, image signal values of the crescent-shaped region 3 are changed, and a star-shaped region 5 and a crescent-shaped region 6 in the target printed matter 4 are printed by different colors.

Without considering such a situation, in a case where matching between image signal values of the original document image 1 and signal values of a read image of the target printed matter 4 is performed to create a target profile from combination of the original document image 1 and the target printed matter 4, a difference between a color of the star-shaped region 5 and a color of the crescent-shaped region 6 in the target printed matter 4 may be exchanged into a color between the two colors (for example, an average value). As a result, Lab values with respect to CMYK values of the star-shaped region 2 and the crescent-shaped region 3 shown in FIG. 1A in the created target profile becomes a color between the color of the star-shaped region 5 and the color of the crescent-shaped region 6 of the target printed matter 4, which causes a problem in that color matching accuracy deteriorates.

Further, even in a case where the above-described target profile is not created, in a case where printing for reproducing the color of the target printed matter 4 is performed from the combination of the original document image 1 and the target printed matter 4, there may be a problem in that a lot of labor is necessary for color adjustment in a plate making process and/or a printing process or color matching is not sufficiently achieved. In the plate making process and/or the printing process, it is rare to partly adjust an image, and it is frequent to adjust an entire color tone using a tone curve, a printing density (ink supply amount). In such a case, it is not possible to perform color matching in which both of the star-shaped region 5 and the crescent-shaped region 6 are compatible, but it takes time for a barren adjustment operation to be close to color reproduction of the target printed matter 4 in a work field of the plate making process or a work field of the printing process. The following embodiments are provided to solve at least one of the above-mentioned problems.

First Embodiment

FIG. 2 is a block diagram showing a configuration of an image processing apparatus 10 according to a first embodiment. FIG. 2 shows a configuration of a processing unit and a flow of data. The image processing apparatus 10 includes an image reading unit 12, an image matching unit 14, a statistical processing unit 16, and a mismatching detection unit 18. The image processing apparatus 10 is configured by a CPU, or the like. Further, as a variety of programs are loaded into the CPU, a variety of functions in the image processing apparatus 10 are performed. This is similarly applied to image processing apparatuses in other embodiments to be described later. In this embodiment, functions of the image reading unit 12, the image matching unit 14, the statistical processing unit 16, and the mismatching detection unit 18 are performed. Further, the image processing apparatus 10 serves as an image inspection apparatus that detects color mismatching between an original document image 20 and a target printed matter 22.

The original document image 20 is original document image data corresponding to a printing image of the target printed matter 22. Here, respective pixels of the original document image 20 correspond to data of CMYK images of signal values of respective color components of C, M, Y, and K. The target printed matter 22 is a printed matter printed on the basis of the original document image 20 or a printed matter printed on the basis of an original document image after color adjustment for which image signal values of the original document image 20 are partially changed. That is, the original document image 20 of the target printed matter 22 is an original document image before adjustment before color adjustment, which is not directly used for printing of the target printed matter 22.

The image reading unit 12 reads a printed matter, converts an optical image into electronic image data, and generates read image data which is a color image indicating the read image. The image reading unit 12 may employ a color image scanner capable of outputting read images as data of RGB signals indicated by image signals of respective color components of R, G, and B. A scanner capable of acquiring read images indicated by image signals of color components of R/G/B is used as the image reading unit 12 in this embodiment. The read image acquired from the image reading unit 12 may be referred to as a "scan image". RGB images obtained from the image reading unit 12 is referred to as "scan RGB images", and image signal values in the scan RGB images are referred to as "scan RGB values".

The image reading unit 12 may employ a camera instead of the scanner. Here, in a case where the camera is used as the image reading unit 12, since an image is easily affected by illumination unevenness in an imaging surface, or the like, it is preferable to perform shading correction, or the like. An image obtained by image capturing using the camera corresponds to the "read image". The term "image capturing" has the same meaning as that of "imaging". The camera includes a two-dimensional image sensor which is an imaging element, and converts a captured optical image into electronic image data to generate captured image data as a color image indicating the captured image. A specific type of the camera is not particularly limited. The camera may be a single-plate type imaging apparatus in which color filters of R, G, and B are disposed like a mosaic in association with respective photosensitive pixels of a light receiving surface of a two-dimensional image sensor, or may be a three-plate type imaging apparatus that includes a two-dimensional image sensor for each channel, with respect to a color separation optical system that divides incident light into color components of R, G, and B and respective channels of R, G, and B.

By reading the target printed matter 22 using the image reading unit 12, a read image 24 of the target printed matter 22 is obtained. The read image 24 is target printed matter read image data obtained by reading of the target printed matter 22, and corresponds to a form of "first read image data". The image reading unit 12 serves as reading image means for reading the read image 24 of the target printed matter 22. A process of reading the target printed matter 22 using the image reading unit 12 to acquire the read image 24 corresponds to a form of an image reading process. Data of the read image 24 acquired through the image reading unit 12 is transmitted to the image matching unit 14.

The image matching unit 14 performs a process of matching a positional relationship between the read image 24 obtained by reading the target printed matter 22 and the original document image 20. That is, the image matching unit 14 performs matching of image positions (that is, pixel positions) between the read image 24 and the original document image 20. Details of processing content in the image matching unit 14 will be described later (see FIGS. 5 to 7).

A correspondence relationship between pixel positions of the original document image 20 and the read image 24 is specified by the image matching unit 14, and data (referred to as "correspondence relationship data 26 between an original document image and a read image") indicating a correspondence relationship between image signal values (in the case of this example, CMYK values) of the original document image 20 and image signal values (in the case of this example, RGB values) of the read image 24 is obtained.

The process of performing matching the positional relationship between the read image 24 and the original document image 20 using the image matching unit 14 corresponds to a form of an image matching process. Further, a processing function of the image matching unit 14 corresponds to a form of an image matching function.

In FIG. 2, the read image 24 input to the image matching unit 14 corresponds to an RGB image, but may correspond to chromaticity value images (for example, Lab images) obtained by conversion from RGB into XYZ values or Lab values as device non-dependent chromaticity values by a color conversion unit (which will be described later) (reference numeral 42 in FIG. 3). The Lab values obtained by RGB→Lab conversion of scan RGB images are referred to as "scan Lab images", and image signal values of the scan Lab images are referred to as "scan Lab images".

The read image 24 or a chromaticity value image created by color-converting the read image 24 are generally referred to as a "target printed matter read image", and a read image signal value which is an image signal value of the target printed matter read image is referred to as a "target printed matter read image signal value".

The statistical processing unit 16 performs a statistical process of generating, using target printed matter read image signal values corresponding to the same original document image signal values (in the case of this example, the same CMYK values) as a population, statistical information that reflects a dispersion (distribution) of the target printed matter read image signal values for each channel of image signals of a target printed matter read image.

The target printed matter read image signal values corresponding to the same original document image signal values represent read image signal values which are signal values of pixels that belong to an image region of the read image 24 corresponding to an image region of the same original document image signal values in the original document image 20 according to matching of image positions specified by the image matching unit 14.

Since the "image region of the same original document image signal value is present for each color used in the original document image 20, the original document image 20 may be divided into the "populations of the target printed matter read image signal values corresponding to the same original document image signal values" by the number of colors used in the original document image 20. In a case where the target printed matter read image signal values are RGB values, the statistical processing unit 16 generates statistical information for each channel of respective components of R, G, and B. In a case where the target printed matter read image signal values are Lab values obtained by conversion of colors of RGB values, the statistical processing unit 16 creates statistical information for each channel of respective components of L, a, and b.

The "same original document image signal values" represent that CMYK values indicated by 8 bits of respective colors of CMYK (0 to 255 gradations) are the same. Alternatively, for example, in a case where an original document image has data of which "the same" range is extremely narrow, such as image data indicated by 16 bits (0 to 65535) in each color of C, M, Y, and K, instead of defining "the same image signal values" on the original document image, image data of 16 bits (0 to 65535) in each color may be converted into image data of 8 bits (0 to 255 gradations) or the like in each color, and "the same image signal values" in data of the original document image after conversion may be used.

The statistical information created by the statistical processing unit 16 may be set as information of at least one of a statistic indicating scattering (dispersion) of target printed matter read image signal values or a histogram of the target printed matter read image signal values.

As the statistic indicating the scattering of the target printed matter read image signal values, a variance, a standard deviation, a range, or the like may be used. Alternatively, a statistic (an average value, a median value, a maximum value, or the like) may be calculated using distances from representative values (average values, median values, modes, or the like) of target printed matter read image signal values corresponding to the same original document image signal values (CMYK values) as a population.

For example, in a case where average values of scan RGB values which are target printed matter read image signal values corresponding to the same original document image signal values (CMYK values) are represented as $(R_{AV}, G_{AV}, B_{AV})$, distances D from the average values are indicated by the following Expression 1.

$$D=\sqrt{(R-R_{AV})^2+(G-G_{AV})^2+(B-B_{AV})^2} \quad \text{Expression 1}$$

Further, in a case where average values of scan Lab values which are target printed matter read image signal values corresponding to the same original document image signal values (CMYK values) are represented as $(L_{AV}, a_{AV}, b_{AV})$, distances D from the average values are indicated by the following Expression 2.

$$D=\sqrt{(L-L_{AV})^2+(a-a_{AV})^2+(b-b_{AV})^2} \quad \text{Expression 2}$$

The distances D from the average values exemplified by Expression 1 or Expression 2 represent color differences from the average values.

The distances D may be defined by using median values or modes instead of the average values $(R_{AV}, G_{AV}, B_{AV})$ of the RGB values or the average values $(L_{AV}, a_{AV}, b_{AV})$ of the Lab values. Using the distances D from the representative values of the target printed matter read image signal values corresponding to the same original document image signal values as a population, a statistic such as an average value, a median value, a maximum value, or the like of the distances D is calculated. The statistic of the distances D calculated in this way is a value that reflects a distribution (dispersion) of the target printed matter read image signal values corresponding to the same original document image signal values (CMYK values).

The statistical processing unit 16 generates statistical information described above with respect to all the image signal values (CMYK values) of the original document image 20. The statistical information generated by the statistical processing unit 16 may be only one type of information among a plurality of types of information described above.

The histogram of the target printed matter read image signal values with respect to the same original document image signal values has a unimodal shape and is formed in a narrow range in a case where color mismatching between the original document image 20 and a target printed matter 22 is not present. On the other hand, in a case where the mismatching is present, the histogram has a multimodal shape, and is formed in a wide range although it has a unimodal shape. Accordingly, in a case where the mismatching is present, a statistic which is an index indicating dispersion of data, such as a variance, a standard deviation, a range or the like of the target printed matter read image signal values, becomes large.

Further, in a histogram of the distances from the representative values of the target printed matter read image signal values with respect to the same original document image signal values, its distribution is narrowed at places close to a distance of "0" in a case where the mismatching is not present. In a case where the mismatching is present, the distribution is enlarged at places distant from the distance of "0" increases. Accordingly, in a case where the mismatching is present, a statistic such as an average value, a median value, a maximum value, or the like may be calculated using the distances from the representative values of the target printed matter read image signal values increases.

Even in a case where the mismatching is present, since it is considered that the distribution is narrowed at places distant from the distance of "0", it is difficult to determine the mismatching using the variance or the standard deviation of the distances from the representative values of the target printed matter read image signal values.

As described above, the histogram of the read image signal values of the target printed matter 22 with respect to the same original document image signal values or the histogram of the distances from the representative values of the target printed matter read image signal values with respect to the same original document image signal values may be utilized as information that reflects dispersion of the target printed matter read image signal values with respect to the same original document image signal values. Accordingly, the statistical processing unit 16 may be configured to create the histogram of the target printed matter read image signal values with respect to the same original document image signal values and the histogram of the distances from the representative values of the target printed matter read image signal values with respect to the same original document image signal values, instead of calculation of the above-mentioned statistic.

Statistical information obtained from a statistic process of read image signal values (for example, RGB signals) which are signal values of the read image 24 is referred to as "read image signal statistical information", and statistical information obtained from a statistic process of read chromaticity values (for example, Lab values) which are signal values of a chromaticity value image obtained by color-converting the read image 24 is referred to as "chromaticity value statistical information".

In FIG. 2, data indicating a correspondence relationship between an original document image signal and read image signal statistical information is created by the statistical processing unit 16. The data indicating the correspondence relationship between the original document image signal and the read image signal statistical information is referred to as "correspondence relationship data 28 between the original document image signal and the read image signal statistical information". A process of generating statistical information by the statistical processing unit 16 corresponds to a form of a statistical processing process. A function of generating the statistical information of the statistical processing unit 16 corresponds to a form of a statistical processing function.

The mismatching detection unit 18 determines the presence or absence of color mismatching between the original document image 20 and the target printed matter 22 on the basis of statistical information calculated for each of the same original document image signal values, created by the statistical processing unit 16. The mismatching detection unit 18 outputs mismatching determination information 30 indicating the presence or absence of the mismatching.

For example, the mismatching detection unit 18 detects that, in a case where a statistic calculated for each of the same original document image signal values exceeds a predetermined threshold value, color mismatching between the original document image 20 and the target printed matter 22 is present. Here, the threshold value may be set in consideration of the size of in-plane scattering of printing or in-plane scattering of scanning in the image reading unit 12. That is, data dispersion due to the in-plane scattering of the printing or the in-plane scattering of the scanning is set to have an allowable range, and thus, should not be detected as color mismatching between the original document image 20 and the target printed matter 22. Further, in-plane scattering of normal printing may be recognized as an allowable value, and in a case where in-plane scattering of printing in brightness is larger than that of the normal printing due to a certain abnormality (for example, adjustment shortage of the amount of supplied ink in an offset printer, or the like), it may be detected that the mismatching is present.

Thus, it is preferable that the sizes of statistics of scan RGB values (or scan Lab values) with respect to the same original document image signal values due to scattering of read image signal values due to the in-plane scattering of the printing or the in-plane scattering of the scan is recognized, and for example, a value larger than a maximum value of each statistic is set to a threshold value. The threshold value may be set by a user.

Further, the mismatching detection unit 18 may determine the presence or absence of the mismatching from the shape of a histogram obtained for each of the same original document image signal values. The mismatching detection unit 18 may determine the presence or absence of the mismatching, and may detect an image region of the mismatching.

A process of detecting the mismatching by the mismatching detection unit 18 corresponds to a form of a mismatching detection process. A function of detecting the mismatching by the mismatching detection unit 18 corresponds to a form of a mismatching detection function.

Second Embodiment

Figure 3:
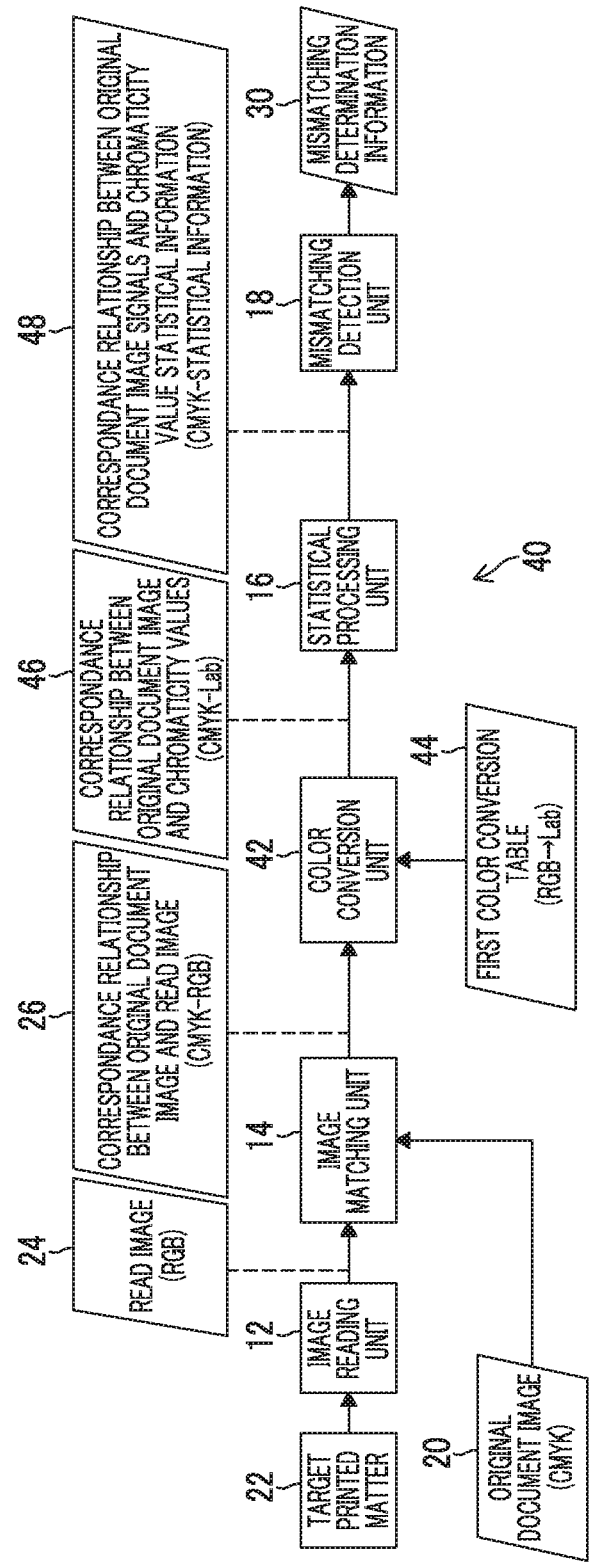
FIG. 3 is a block diagram showing a configuration of an image processing apparatus according to a second embodiment.

FIG. 3 is a block diagram showing a configuration of an image processing apparatus 40 according to a second embodiment. In FIG. 3, the same reference numerals are given to the same or similar components as in the configuration shown in FIG. 2, and description thereof will not be repeated.

The image processing apparatus 40 shown in FIG. 3 has a configuration in which a color conversion unit 42 is additionally provided between the image matching unit 14 and the statistical processing unit 16, compared with the image processing apparatus 10 described in FIG. 2. The color conversion unit 42 performs a process of converting read image signal values indicated by signal values (in this example, RGB values) of color components in a device dependent color space into read image signal values after color conversion indicated by signal values (in this example, Lab values) of color components in a device non-dependent color space.

That is, the color conversion unit 42 performs a color conversion process of converting, using a first color conversion table 44 which is prepared in advance, read image signal values (in this example, RGB values) which are signal values of the read image 24 into device non-dependent chromaticity values (in this example, Lab values). The first color conversion table 44 is a color conversion table of a scanner profile and is a table that regulates a correspondence relationship between RGB values which are read image signal values in a device dependent color space obtained by the image reading unit 12 and device non-dependent Lab values. Here, the device non-dependent color space uses an Lab color space, but may use another device non-dependent color space such as an XYZ color space.

Data ("correspondence relationship data 46 between original document image signals and chromaticity values") indicating a correspondence relationship between original document image signals (CMYK values) and chromaticity values (Lab values) is obtained through an image matching process in the image matching unit 14 and a color conversion process in the color conversion unit 42.

The statistical processing unit 16 performs a statistical process generating, using chromaticity value signal values of target printed matter read image signal values corresponding to the same original document image signal values (CMYK values) as a population, on the basis of the correspondence relationship data 46 between the original document image signals and the chromaticity values, statistical information that reflects dispersion (distribution) of the chromaticity value signal values for each channel. Data (referred to as "correspondence relationship data 48 between original document image signals and chromaticity value statistical information") indicating a correspondence relationship between original document image signals and chromaticity value statistical information is created by the statistical processing unit 16.

FIG. 2 shows a case where statistical information is calculated from RGB values, and FIG. 3 shows a case where statistical information is calculated from Lab values. However, it is preferable to calculate statistical information from chromaticity values such as Lab values. RGB values are device dependent values, that is, values dependent on models or settings of a scanner used in the image reading unit 12, but chromaticity values such as Lab values are values which are not dependent on devices (models or settings). Accordingly, statistical information calculated from the chromaticity values such as Lab values may be handled as values that do not dependent on devices (values are not greatly changed according to devices).

Third Embodiment

Figure 4:
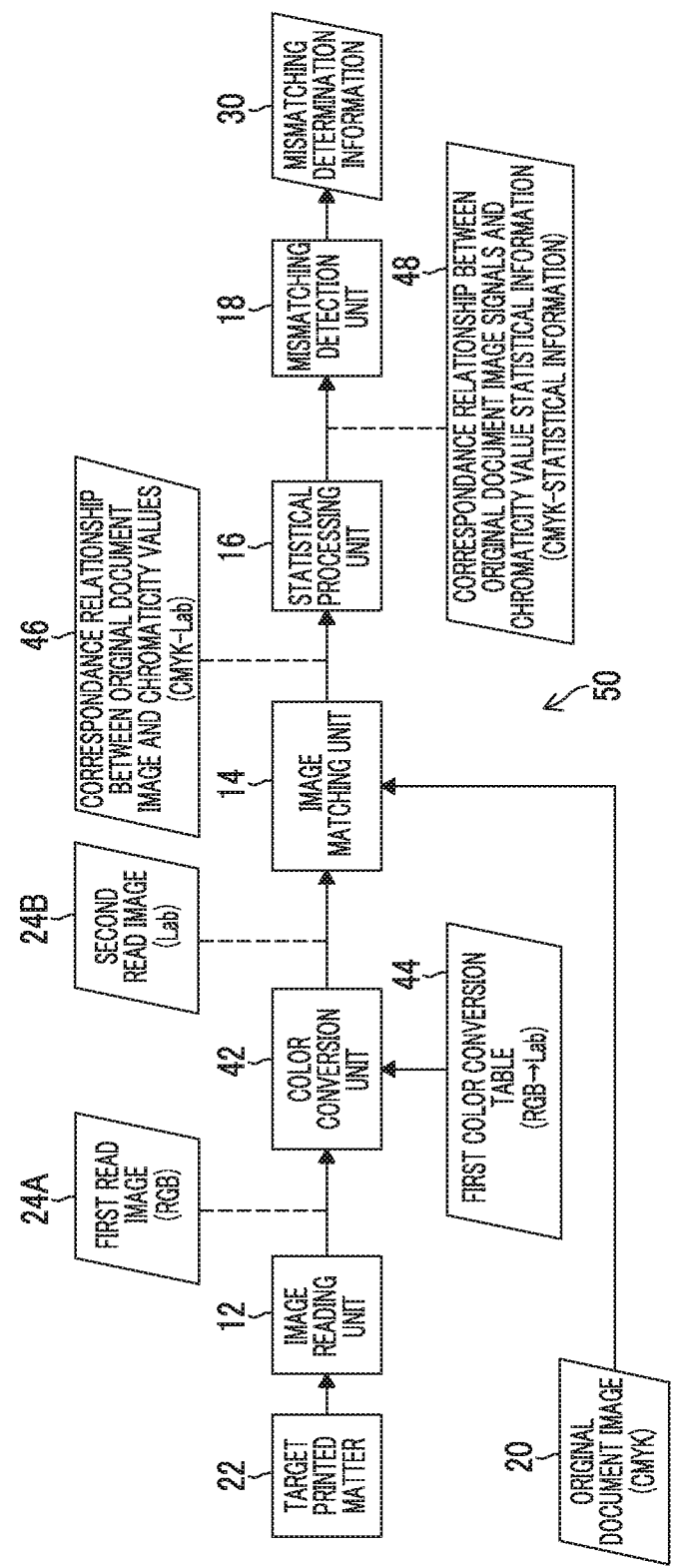
FIG. 4 is a block diagram showing a configuration of an image processing apparatus according to a third embodiment.

FIG. 4 is a modification example of the configuration shown in FIG. 3. In FIG. 4, the same reference numerals are given to components that are the same or similar to the components described in FIG. 3, and description thereof will not be repeated.

An image processing apparatus 50 shown in FIG. 4 according to a third embodiment has a configuration in which processing orders of the image matching unit 14 and the color conversion unit 42 are exchanged, compared with the configuration shown in FIG. 3. In the example of FIG. 4, a color conversion process in the color conversion unit 42 is performed with respect to a first read image 24A which is an RGB image obtained from the image reading unit 12 to obtain a second read image 24B. Since the color conversion unit 42 of this embodiment performs conversion from RGB to Lab using the first color conversion table 44, the second read image 24B becomes an Lab image. The first read image 24A corresponds to a form of "first read image data", and the second read image 24B corresponds to a form of "second read image data".

The image matching unit 14 performs matching of positions between the second read image 24B created by color conversion of the color conversion unit 42 and the original document image 20. Thus, the correspondence relationship data 46 between the original document image and chromaticity values is obtained. Subsequent processes are the same as in the example described in FIG. 3. In the configuration shown in FIG. 4, the same effects as in the configuration of FIG. 3 may be obtained.

As shown in FIG. 4, the second read image 24B after color conversion obtained by performing a color conversion process with respect to the first read image 24A obtained from the image reading unit 12 using the color conversion unit 42 is referred to as a "read chromaticity value image".

Any one of the read image 24 obtained from the image reading unit 12 described in FIGS. 2 and 3, and the first read image 24A and the second read image 24B described in FIG. 4 represents a read image of the target printed matter 22 obtained from the image reading unit 12. Accordingly, the read image 24, the first read image 24A, and the second read image 24B may be generally referred to as "read images".

The read image 24 obtained from the image reading unit 12 described in FIGS. 2 and 3 and the first read image 24A described in FIG. 4 are read images before color conversion, and the second read image 24B described in FIG. 4 is a read image after color conversion.

A read image before color conversion is a scan RGB image. Further, as shown in FIG. 4, the second read image 24B which is a read image after color conversion obtained by performing a color conversion process with respect to the first read image 24A obtained by image reading unit 12 using the color conversion unit 42 is a scan Lab image.

[Image Matching Unit 14]

Processes of the image matching unit 14 shown in each of the configurations of FIGS. 2 to 4 will be described. The image matching unit 14 performs matching between image positions (that is, pixel positions) of an original document image data and read image data acquired through reading of a printed matter.

Here, the read image data generally refers to the read image 24 obtained from the image reading unit 12 described in FIGS. 2 and 3, and the first read image 24A and the second read image 24B described in FIG. 4. That is, the read image data corresponds to any one of a scan RGB image obtained from the image reading unit 12 or a scan Lab image which is a read chromaticity value image obtained through color conversion of the scan RGB image in the color conversion unit 42. The read image data in the case of the configurations shown in FIGS. 2 and 3 becomes an RGB image, and the read image data in the case of the configuration shown in FIG. 4 becomes a read chromaticity value image (Lab image).

The process of matching (registering) image positions between the original document image data and the read image data may employ a known image registration method. For example, the image registration method may employ a method disclosed in paragraph <0064> to paragraph <0068> of JP2013-30996A.

Figure 5:
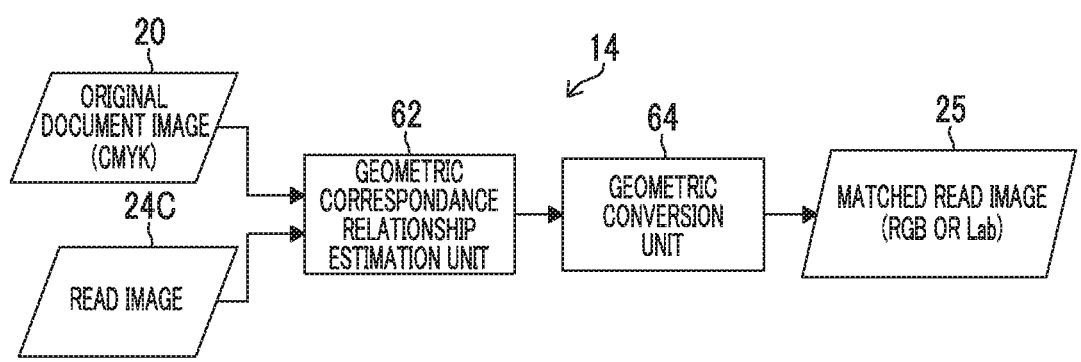
FIG. 5 is a block diagram showing a specific example of an image registration process in an image matching unit.

FIG. 5 is a block diagram showing a specific example of an image registration process in the image matching unit 14. The image matching unit 14 includes a geometric correspondence relationship estimation unit 62 and a geometric conversion unit 64. The geometric correspondence relationship estimation unit 62 imports an original document image 20 and a read image 24C, and estimates a geometric correspondence relationship between the two images. The geometric correspondence relationship includes at least one element among a displacement, a rotational angle, and a variable magnification between two images to be compared.

The read image 24C represents read image data of any one of the read image 24 obtained from the image reading unit 12 described in FIGS. 2 and 3, and the first read image 24A and the second read image 24B described in FIG. 4.

The geometric conversion unit 64 performs, with respect to any one or both of two images, a geometric conversion process of matching both the images on the basis of a geometric correspondence relationship estimated in the geometric correspondence relationship estimation unit 62. For example, a configuration in which geometric conversion is performed with respect to data of the read image 24C and is not performed with respect to data of the original document image 20 may be used. Further, the affine conversion may be applied as an example of the geometric conversion.

For estimation of a geometric correspondence relationship between two images, (a) a method using a marker, (b) a method using pattern matching (b), (c) a method using phase-only correlation, or the like may be used. Hereinafter, description will be made while incorporating the disclosure in JP2013-30996A.

(a) Method Using Marker

A printed matter in which a marker indicating a reference position referred to as a so-called "crop mark" in a printing field is disposed at four edges of an original document image or at the center of each side is output. In a case where a printed matter with such a marker is read, by estimating the amount of position deviation of the marker, it is possible to calculate a displacement, a rotational angle, and a variable magnification between images.

For example, four to six markers are formed in one printed matter. By comparing position deviation between markers on original document image data and markers on read image data of a printed matter, it is possible to calculate a geometric conversion parameter.

By calculating a correspondence relationship between a point indicating a position of a feature point of a marker in the original document image data and a point indicating a position of a feature point of a marker in the read image data, it is possible to obtain the geometric conversion parameter. Here, a technique for performing the affine conversion, for example, with respect to at least one image among two images to match two point patterns is known. Accordingly, in order to calculate the geometric conversion parameter, a method for searching an optimal affine parameter indicating that respective positions of two point patterns are closest to each other may be used. For example, an evaluation function of an affine parameter for affine-converting a feature point of a marker in the read image data into a feature point of a marker in the original document image data is determined, and an affine parameter in a case where the evaluation function becomes a minimum is used as the geometric conversion parameter.

(b) Method Using Pattern Matching Method

As an example of a method for estimating only a displacement, a template matching method may be used. The template matching method calculates, using one image as a template, the degree of matching with the other image while gradually shifting the position, and detects a position where the degree of matching becomes highest. In a case where geometric conversion cannot be defined with only a displacement, it is necessary to combine a method for estimating a rotational angle (Hough transform or the like) or a method for estimating a variable magnification (multi-scale analysis or the like) with the displacement for the geometric conversion.

In a block matching method which is an application of the template matching, one image is divided into blocks, and a position where the degree of matching with the other image becomes highest is detected for each block so that a displacement can be calculated. In the block matching method, it is also possible to estimate a rotational angle or a variable magnification from the displacement for each block.

(c) Method Using Phase-Only Correlation

As an example of a method for calculating a displacement, a rotational angle, and a variable magnification with high accuracy, a phase-only correlation (POC) or a rotation invariant phase-only correlation (RIPOC) is used. The phase-only correlation is a method for detecting, using a phase image obtained through discrete Fourier transform with respect to an image, a position where the correlation between two phase images obtained from two images that are comparison targets becomes highest to obtain a displacement. Further, the rotation invariable phase-only correlation is a method for performing log polar coordinate conversion with respect to a phase image and detecting a rotational angle and a variable magnification as a displacement on the converted phase image.

After the geometric conversion parameter is calculated using the above-mentioned (a) to (c) methods, or the like, the geometric conversion unit 64 executes geometric conversion with respect to the read image 24C and/or the original document image 20. In the conversion, in a case where pixels before and after conversion do not match each other in one-to-one correspondence due to movement or any rotation of a sub-pixel accuracy, a variable power at an actual value, or the like, pixel values may be derived using an appropriate pixel interpolation method. As an example of the pixel interpolation method, a binary method, a bi-cubic method, or the like may be used.

In this way, the matching of the positional relationship between the original document image 20 and the read image 24C is determined, and a matched read image 25 is acquired. The correspondence relationship data 26 between the original document image and the read image described in FIGS. 2 and 3, or the correspondence relationship data 46 between the original document image and the chromaticity values described in FIG. 4 may be created from the matched read image 25 and original document image 20. Alternatively, a set of the matched read image 25 and original document image 20 may be handled as the correspondence relationship data 26 between the original document image and the read image described in FIGS. 2 and 3 or the correspondence relationship data 46 between the original document image and the chromaticity values described in FIG. 4.

[Pretreatment for Image Matching (Registration)]

In a case where the resolution of the original document image 20 and the resolution of the read image 24C are different from each other, it is preferable to perform resolution conversion for matching with the resolution of the original document image 20 with respect to the read image 24C using the image matching unit 14. The image matching unit 14 is configured to include a resolution conversion unit (not shown) for performing a resolution conversion process.

Further, for example, in a case where color spaces of the original document image 20 and the read image 24C are different from each other, for example, in a case where the original document image 20 is a CMYK image and the read image 24C is an RGB image, it is preferable to perform grayscale conversion with respect to both the images to convert the images into the same color space before registration (matching) of images is performed using the image matching unit 14.

The grayscale conversion may be realized by converting the read image 24C into Lab values using a color conversion table (the first color conversion table 44 in FIG. 3) of a scanner profile to form a monochromic image obtained by extracting only an L value (brightness). With respect to the original document image 20, a representative profile or the like such as Japan Color (registered trademark) may be used, for example.

Further, even in a case where both of the original document image 20 and the read image 24C are subjected to the grayscale conversion, it may be considered that pixel values (density values) are different from each other. Thus, an edge extraction process may be performed with respect to grayscale images to convert the images into binary edge images, and then, registration may be performed. As the edge extraction process, a Sobel method, a Prewitt method, or the like may be used.

Further, since it may also be considered that edge sizes of two edge images are different from each other, a thinning process may be performed with respect to the respective edge images to adjust the edge thicknesses, and then, registration may be performed. As the thinning process, a Hilditch method, a Tamura's method, or the like may be used.

In a case where color spaces of images are different from each other in the original document image 20 and the read image 24C as described above, it is preferable to perform pretreatment for registration to easily estimate a geometric correspondence relationship between images. Even in a case where the original document image 20 and the read image 24C have the same color space, the pretreatment may be performed.

Furthermore, a case in which the target printed matter 22 and the original document image 20 do not match each other in one-to-one correspondence may be considered. For example, as the case where the target printed matter 22 and the original document image 20 do not match each other in one-to-one correspondence, there are the following examples.

Example 1

A case where the target printed matter 22 is a printed matter in which a plurality of same original document images 20 are disposed on the same printing surface.

Example 2

A case where the target printed matter 22 is a printed matter in which the original document image 20 and separate image data which is not a color matching target (another piece of image data different from the original document image 20) are disposed on the same printing surface. A state where plural pieces of image data that are different from each other are disposed on the same printing surface is referred to as "different kinds of pagination", "ganging", or the like.

Example 3

A case where the original document image 20 forms a part (a part of a design or a layout) of the target printed matter 22.

In a case where the target printed matter 22 and the original document image 20 do not match each other in one-to-one correspondence as exemplified in <Example 1> to <Example 3>, it is useful to perform a partial image extraction process of extracting a partial image corresponding to the target original document image 20 from a read image of the target printed matter 22.

Here, as a more specific example of <Example 1>, a case where the target printed matter 22 is a printed matter in which a plurality of same original document images 20 are disposed (paginated) in a nested form will be described.

Figure 6A:
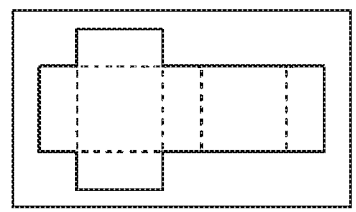
FIG. 6A is a diagram showing an example of an original document image.
Figure 6B:
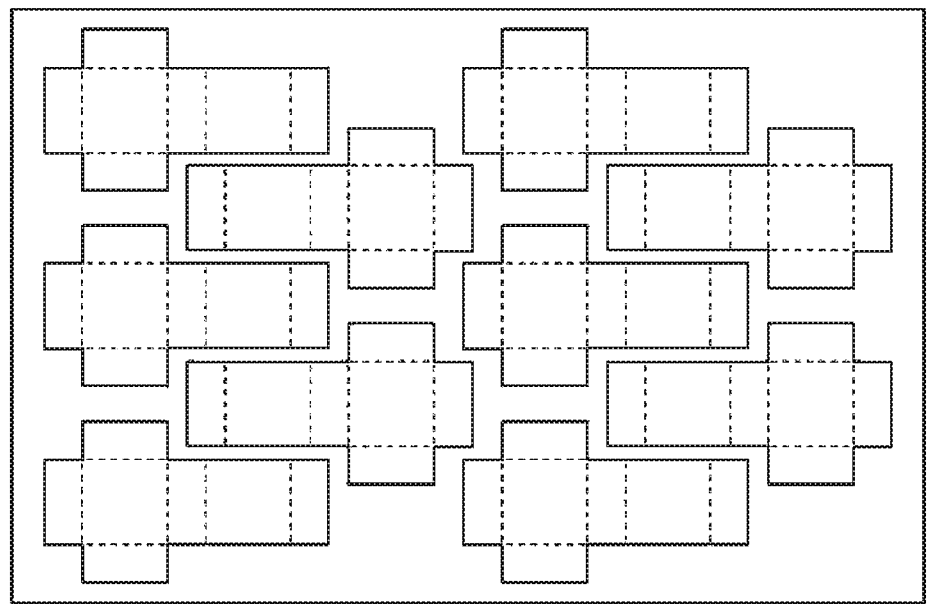
FIG. 6B is a diagram showing an example of a target printed matter.

An example thereof is shown in FIGS. 6A and 6B. FIG. 6A shows an example of an original document image, and FIG. 6B shows an example of a target printed matter. The target printed matter shown in FIG. 6B is a printed matter in which a plurality of pieces of original document image data in FIG. 6A are disposed (paginated) in a nested form in a printing surface and are printed.

In such a case, it is preferable that read image data of the target printed matter is not used as it is and a partial image corresponding to the original document image data in the read image data is extracted in advance before registration in the image matching unit 14.

As a method for the extraction process of the partial image, a method for specifying a partial image corresponding to an original document image using known pattern matching to automatically extract a partial image, a method for displaying a read image on a display unit (disclosed as reference numeral 234 in FIG. 16) and manually designating a range of a partial image corresponding to an original document image from a user, or the like may be used.

The invention is not limited to the case of <Example 1>, and it is similarly useful to perform the partial image extraction process with respect to the cases of <Example 2> and <Example 3>.

The partial image extraction process is not necessary in a case where the original document image 20 and the target printed matter 22 do not match each other in one-to-one correspondence, for example, in a case where a color sample corresponding to one original document image is provided from a client.

Figure 7:
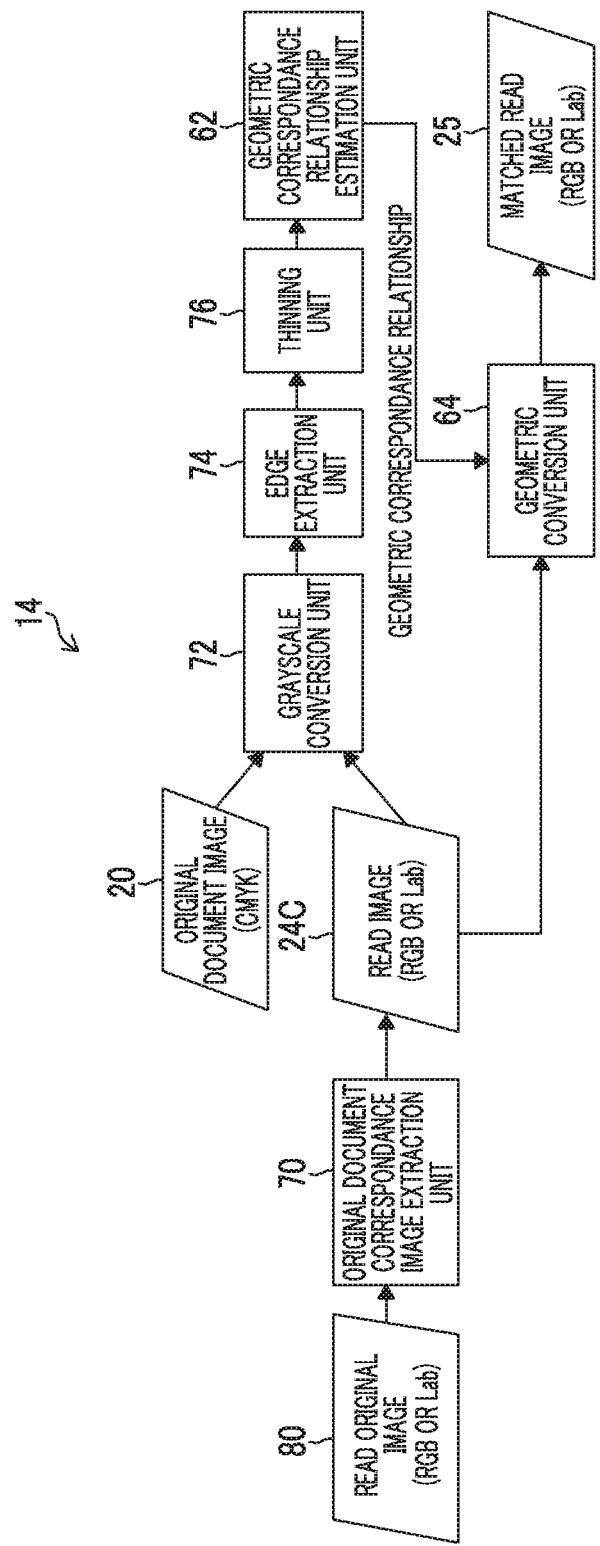
FIG. 7 is a block diagram of a configuration for performing an image matching process including a pretreatment.

FIG. 7 is a block diagram of a configuration for performing an image matching process including the above-described pretreatment. The image matching unit 14 shown in FIG. 7 includes an original document correspondence image extraction unit 70, a grayscale conversion unit 72, an edge extraction unit 74, a thinning unit 76, a geometric correspondence relationship estimation unit 62, and a geometric conversion unit 64.

The original document correspondence image extraction unit 70 performs a process of extracting a partial image corresponding to the original document image 20 from a read original image 80 which is an original image of a read image obtained by reading the target printed matter 22 in which a plurality of images are paginated as shown in FIG. 6B. The read original image 80 is data of a read image generated by reading the entirety of a printing surface of a target printed matter as shown in FIG. 6B. The read original image 80 may be an RGB image or an Lab image.

Data of a partial image extracted by the original document correspondence image extraction unit 70 becomes the read image 24C to be compared with the original document image 20.

The grayscale conversion unit 72 performs a process of converting the original document image 20 and the read image 24C into grayscales, respectively. The edge extraction unit 74 performs a process of extracting edge images from grayscale images. The thinning unit 76 performs a process of thinning the edge images generated by the edge extraction unit 74.

The edge images thinned by the thinning unit 76 are input to the geometric correspondence relationship estimation unit 62, and a geometric correspondence relationship between the original document image 20 and the read image 24C is specified by the geometric correspondence relationship estimation unit 62. A geometric conversion process is performed with respect to the read image 24C by the geometric conversion unit 64 using the calculated geometric correspondence relationship to obtain the matched read image 25.

A matching process function in the image matching unit 14 corresponds to an "image matching function". In a case where the original document image 20 and the printing image of the target printed matter 22 match each other in one-to-one correspondence, the read original image 80 in FIG. 7 is handled as the read image 24C as it is.

Fourth Embodiment

Figure 8:
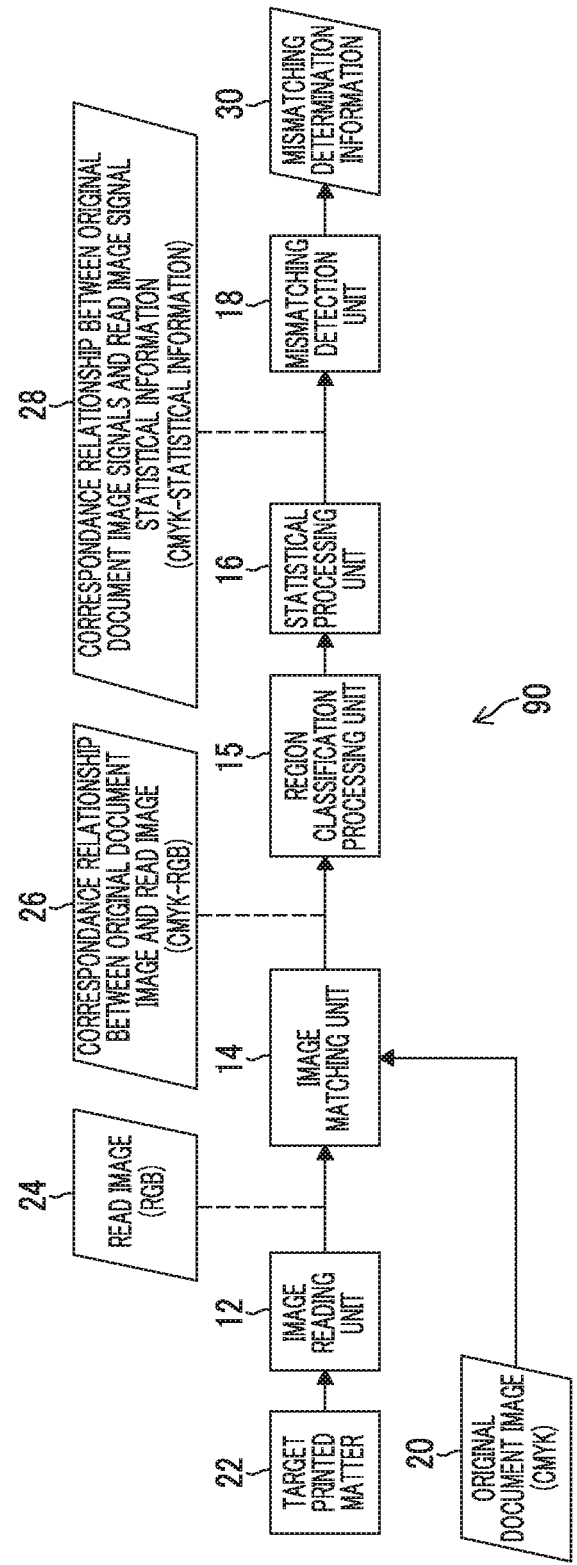
FIG. 8 is a block diagram showing a configuration of an image processing apparatus according to a fourth embodiment.

FIG. 8 shows a modification example of the configuration shown in FIG. 2. In FIG. 8, the same reference numerals are given to the same or similar components as in the configuration described in FIG. 2, and description thereof will not be repeated.

In a fourth embodiment, an image processing apparatus 90 shown in FIG. 8 has a configuration in which a region classification processing unit 15 is additionally provided between the image matching unit 14 and the statistical processing unit 16, compared with the image processing apparatus 10 described in FIG. 2.

The region classification processing unit 15 performs a process of classifying, on the basis of original document image signal values of respective pixels of the original document image 20, the respective pixels of the original document image 20 into a set of pixels having the same original document image signal values to divide the original document image 20 into image regions of the same original document image signal values. The original document image 20 is region-divided for each color used in the original document image 20 (that is, for each image signal value used in the original document image 20), and are classified into image regions (set of pixels) of which the number is the same as the number of used colors.

Each image region classified for each color in the region classification processing unit 15 is referred to as a "same original document image signal value region". Since position matching of the original document image 20 and the read image 24 is recognized by the process of the image matching unit 14, it is possible to specify an image region on the read image 24 corresponding to the same original document image signal value region in the original document image 20. Namely, the read image 24 may be also divided into image regions respectively corresponding to the same original document image signal value region.

A process of performing a process of dividing the original document image 20 into image regions having the same original document image signal values using the region classification processing unit 15 corresponds to a form of a region classification processing process. A processing function of the region classification processing unit 15 corresponds to a form of a region classification processing function.

The statistical processing unit 16 performs a statistical process using a pixel group of a read image that belongs to an image region of the read image corresponding to each original document image signal value region classified by the region classification processing unit 15 as a population to generate statistical information of at least one of a statistic indicating scattering of read image signal values of pixels that belong to the population or a histogram of the read image signal values.

It can be understood that a function corresponding to the process of the region classification processing unit 15 described in FIG. 8 is substantially included in the statistical processing unit 16 described in FIGS. 2 to 4.

Alternatively, similar to the example described in FIG. 8, a configuration in which the region classification processing unit 15 is additionally provided between the color conversion unit 42 and the statistical processing unit 16 in the configuration of FIG. 3 or 4 may be used.

Fifth Embodiment

Figure 9:
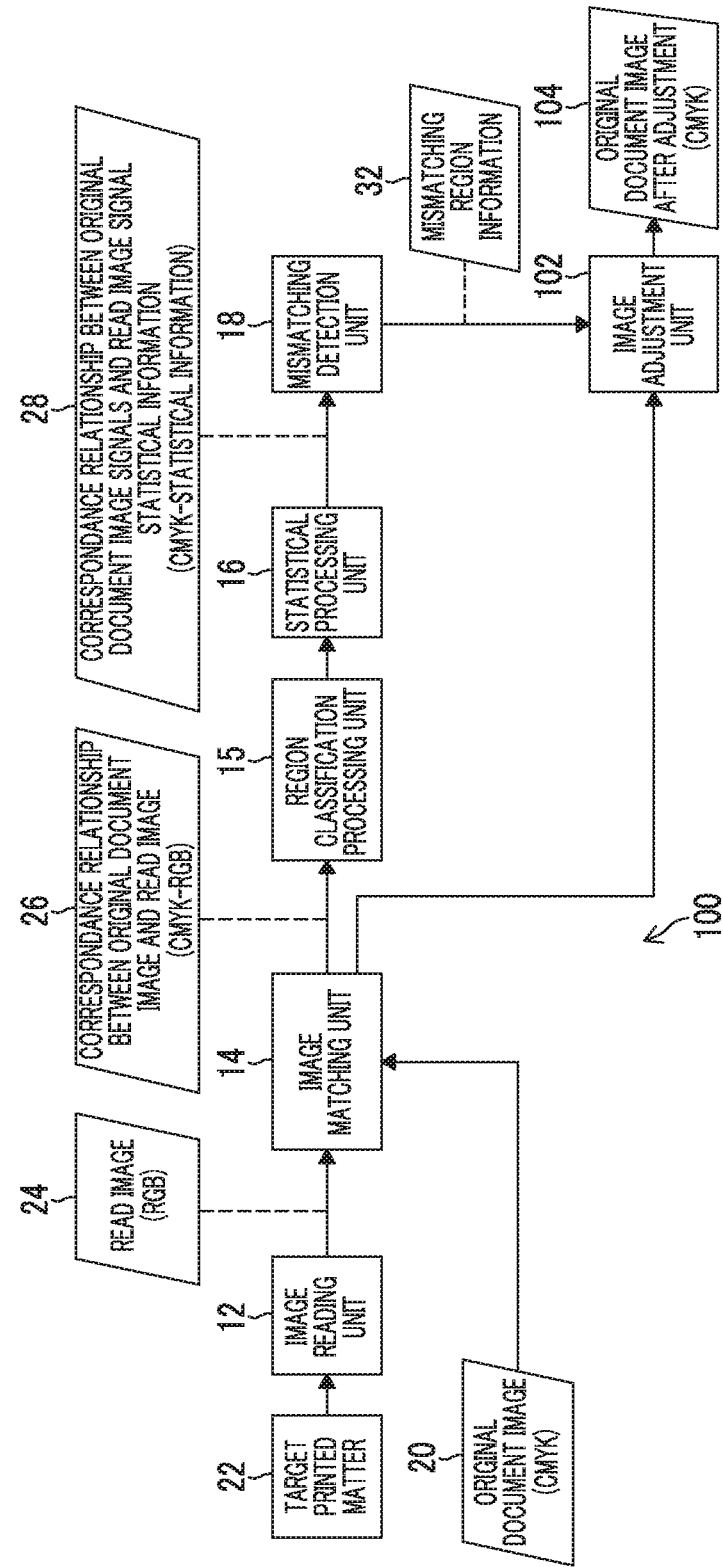
FIG. 9 is a block diagram showing a configuration of an image processing apparatus according to a fifth embodiment.

FIG. 9 is a block diagram showing a configuration of an image processing apparatus 100 according to a fifth embodiment. In FIG. 9, the same reference numerals are given to the same or similar components as in the configuration shown in FIGS. 2 and 8, and description thereof will not be repeated. The image processing apparatus 100 shown in FIG. 9 has a configuration in which an image adjustment unit 102 is additionally provided, compared with the image processing apparatus 90 described in FIG. 5.

The image adjustment unit 102 performs adjustment of image signal values of the original document image 20 on the basis of mismatching region information obtained from the mismatching detection unit 18. The adjustment of the image signal values means correction (changing) of the image signal values into different values.

The mismatching detection unit 18 detects a mismatching region with a different color on the target printed matter 22, regardless of an image region of the same original document image signal values on the data of the original document image 20. In a case where the mismatching region is detected, the image adjustment unit 102 is configured to adjust original document image signal values in the mismatching region to separate colors, in a similar way to the target printed matter 22 on the original document image signal values.

An original document image 104 after adjustment is obtained as the original document image signal values in the mismatching region are adjusted by the image adjustment unit 102. By creating a color conversion table of a target profile on the basis of the original document image 104 after adjustment created in this way and the read image 24 of the target printed matter 22, it is possible to simplify a color matching adjustment operation with respect to the target printed matter 22, to thereby enhance color reproduction accuracy.

The image processing apparatus 40 shown in FIG. 3 or the image processing apparatus 90 shown in FIG. 4 may have a configuration in which the image adjustment unit 102 is provided, similar to FIG. 9.

Sixth Embodiment

Figure 10:
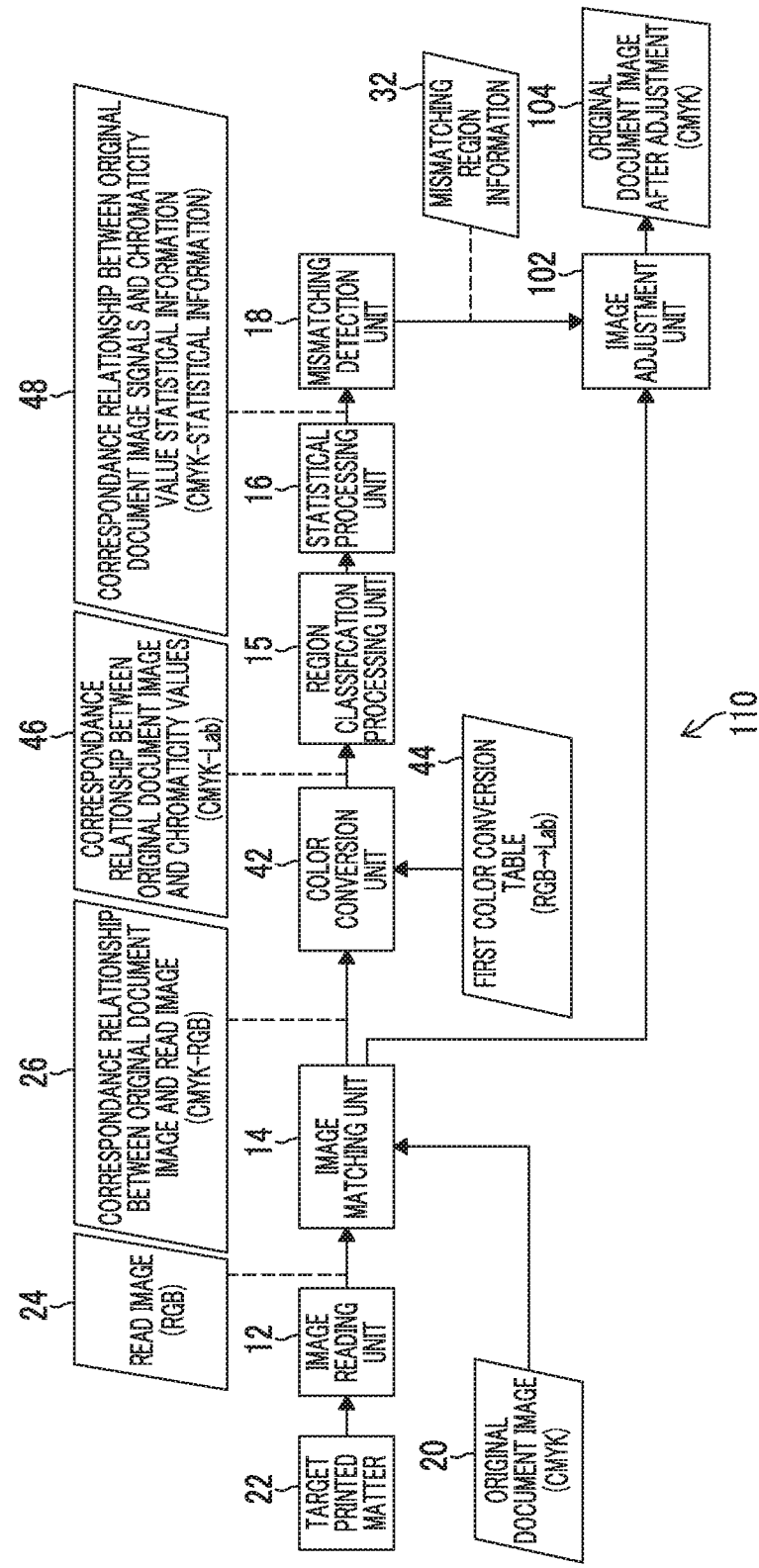
FIG. 10 is a block diagram showing a configuration of an image processing apparatus according to a sixth embodiment.

FIG. 10 is a block diagram showing a configuration of an image processing apparatus 110 according to a sixth embodiment. The image processing apparatus 110 shown in FIG. 10 has a configuration in which the image adjustment unit 102 is additionally provided in the configuration of the image processing apparatus 40 described in FIG. 3. In FIG. 10, the same reference numerals are given to the same or similar components as in the configuration shown in FIGS. 3 and 9, and description thereof will not be repeated.

[First Example of Image Adjustment Method]

Here, a specific example of an image adjustment method in the image adjustment unit 102 will be described.

By the mismatching detection unit 18, scan RGB value groups (Rs, Gs, Bs) in an original document image signal value (Cd, Md, Yd, Kd) region detected as a mismatching region are converted into scan CMY value groups (Cs0, Ms0, Ys0) according to the following Expression 3. Here, the image signal values are represented as 8-bit values of 0 to 255.

$$Cs0=255-Rs,\ Ms0=255-Gs,\ Ys0=255-Bs \quad \text{Expression 3}$$

Further, the value groups are converted into scan CMYK value groups (Cs, Ms, Ys, Ks) according to the flowing Expression 4.

$$Cs=\min(255,\max(0,Cs0-Kd))$$

$$Ms=\min(255,\max(0,Ms0-Kd))$$

$$Ys=\min(255,\max(0,Ys0-Kd))$$

$$Ks=Kd \quad \text{Expression 4}$$

Here, min (a, b) is a function that returns a small value among a and b, max (a, b) is a function that returns a large value a and b.

Then, the amounts of adjustment (Ca, Ma, Ya, Ka) based on differences between the scan CMYK value groups in the mismatching region and average values (or intermediate values or modes) of CMYK value groups are calculated. The amounts of adjustment (Ca, Ma, Ya, Ka) may be expressed according to the following Expression 5.

$$Ca=W(Cs-Cs_A)$$

$$Ma=W(Ms-Ms_A)$$

$$Ya=W(Ys-Ys_A)$$

$$Ka=W(Ks-Ks_A)=0 \quad \text{Expression 5}$$

Here, W represents a coefficient for adjusting the magnitude of the amounts of adjustment. Normally, W is set to "1.0".

$(Cs_A, Ms_A, Ys_A, Ks_A)$ represent average values, intermediate values, or modes in the scan CMYK value groups in the mismatching region. $(Cs_A, Ms_A, Ys_A, Ks_A)$ correspond to representative values of scan CMYK value groups in the mismatching region.

Further, the amounts of adjustment (Ca, Ma, Ya, Ka) are added to the original document image signal values (Cd, Md, Yd, Kd) in the mismatching region for adjustment. In a case where original document image signal values after adjustment are written as (Cda, Mda, Yda, Kda), the following Expression 6 is obtained.

$$Cda=Cd+Ca$$

$$Mda=Md+Ma$$

$$Yda=Yd+Ya$$

$$Kda=Kd+Ka=Kd \quad \text{Expression 6}$$

As described above, the image adjustment unit 102 converts read image signal values (scan RGB values) of pixels that belong to a mismatching region of scan RGB images which are read images into signal values (scan CMYK values) based on a CMYK color space which is a color space of the original document image 20, calculates $(Cs_A, Ms_A, Ys_A, Ks_A)$ which are representative values of signal value groups in a mismatching region, and calculates the amount of adjustment (Ca, Ma, Ya, Ka) on the basis of differences between the scan CMYK signal values and the representative values of pixels that belong to the mismatching region. Further, the image adjustment unit 102 adds the calculated amount of adjustment to original document image signal values of corresponding pixels in the mismatching region to adjust the image signal values of the original document images 20.

It is determined whether the respective pixels of the original document image belong to the mismatching region, and original document image signal values of pixels that belong to the mismatching region are adjusted using the above-mentioned image adjustment method. Thus, original document image signal values corresponding to image region having different colors on the target printed matter 22 become different values.

It may also be considered that noise is mixed into scan RGB values due to noise in scanning or waste and/or scar on a printed matter, for example. In this case, noise is also mixed into original document image signal values adjusted according to the above-mentioned procedure. Particularly, in a region (a so-called screen tint region) in which the same CMYK values are spread over a considerable area on an original document image, there is a concern that noise is noticeable in a printed matter printed using the original document image after adjustment. In order to prevent this problem, it is preferable to perform a smoothing process (for example, an averaging process in all directions of neighboring several pixels) with respect to a printed matter scan image and then to calculate the amount of adjustment, or to perform a smoothing process (an averaging process in neighboring pixels, for example) with respect to the calculated amount of adjustment. Alternatively, the smoothing process may be performed with respect to both of a scan image and the amount of adjustment.

Seventh Embodiment

[Second Example of Image Adjustment Method]

Figure 11:
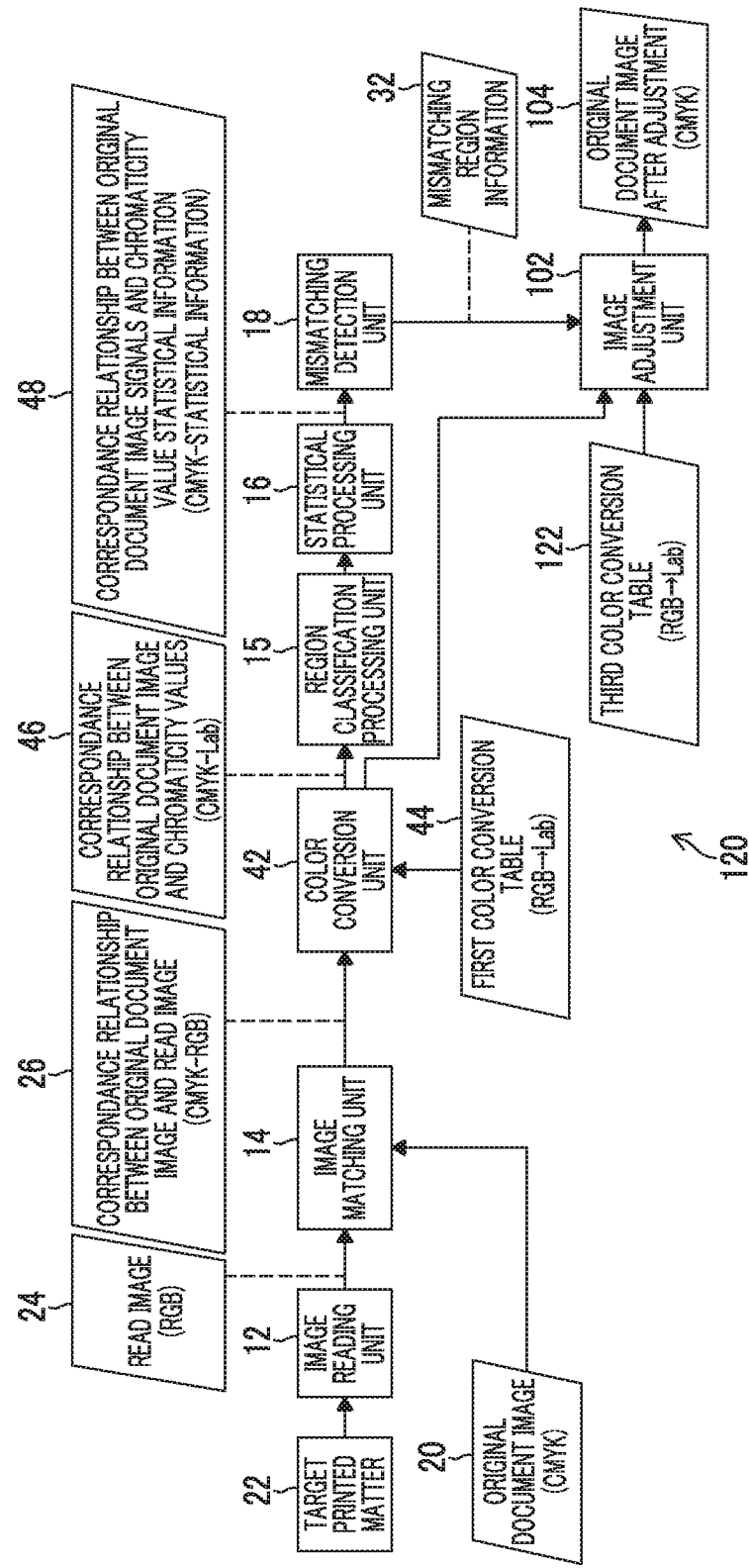
FIG. 11 is a block diagram showing a configuration of an image processing apparatus according to a seventh embodiment.

Next, a second example of the image adjustment method in the image adjustment unit 102 will be described with reference to FIG. 11. FIG. 11 shows a modification example of the configuration shown in FIG. 10, which is a block diagram showing a configuration of an image processing apparatus 120 according to the seventh embodiment. In FIG. 11, the same reference numerals are given to the same or similar components as in the configuration shown in FIG. 10, and description thereof will not be repeated.

The image adjustment unit 102 in the image processing apparatus 120 shown in FIG. 11 acquires scan Lab values corresponding to a mismatching region on the basis of the mismatching region information 32 obtained from the mismatching detection unit 18 and the correspondence relationship data 46 between an original document image and chromaticity values obtained through a color conversion process of the color conversion unit 42. Further, the image adjustment unit 102 converts the scan Lab values into scan CMYK values (Cs, Ms, Ys, Ks) corresponding to the mismatching region using a third color conversion table 122 which is prepared in advance.

The third color conversion table 122 may employ an Lab→CMYK conversion table of an appropriate printing profile such as a standard profile including a Japan Color (registered trademark) profile or a profile of a printing apparatus used in printing.

Subsequent processes to the process of converting the scan Lab values corresponding to the mismatching region into the scan CMYK values (Cs, Ms, Ys, Ks) using the third color conversion table 122 are the same as in the above-described first example of the image adjustment unit. Here, in the second example, Ka is not necessarily "0". In comparing the first example of the image adjustment method with the second example thereof, the second example in which chromaticity values that do not depend on a device are used is more preferable.

Eighth Embodiment

Figure 12:
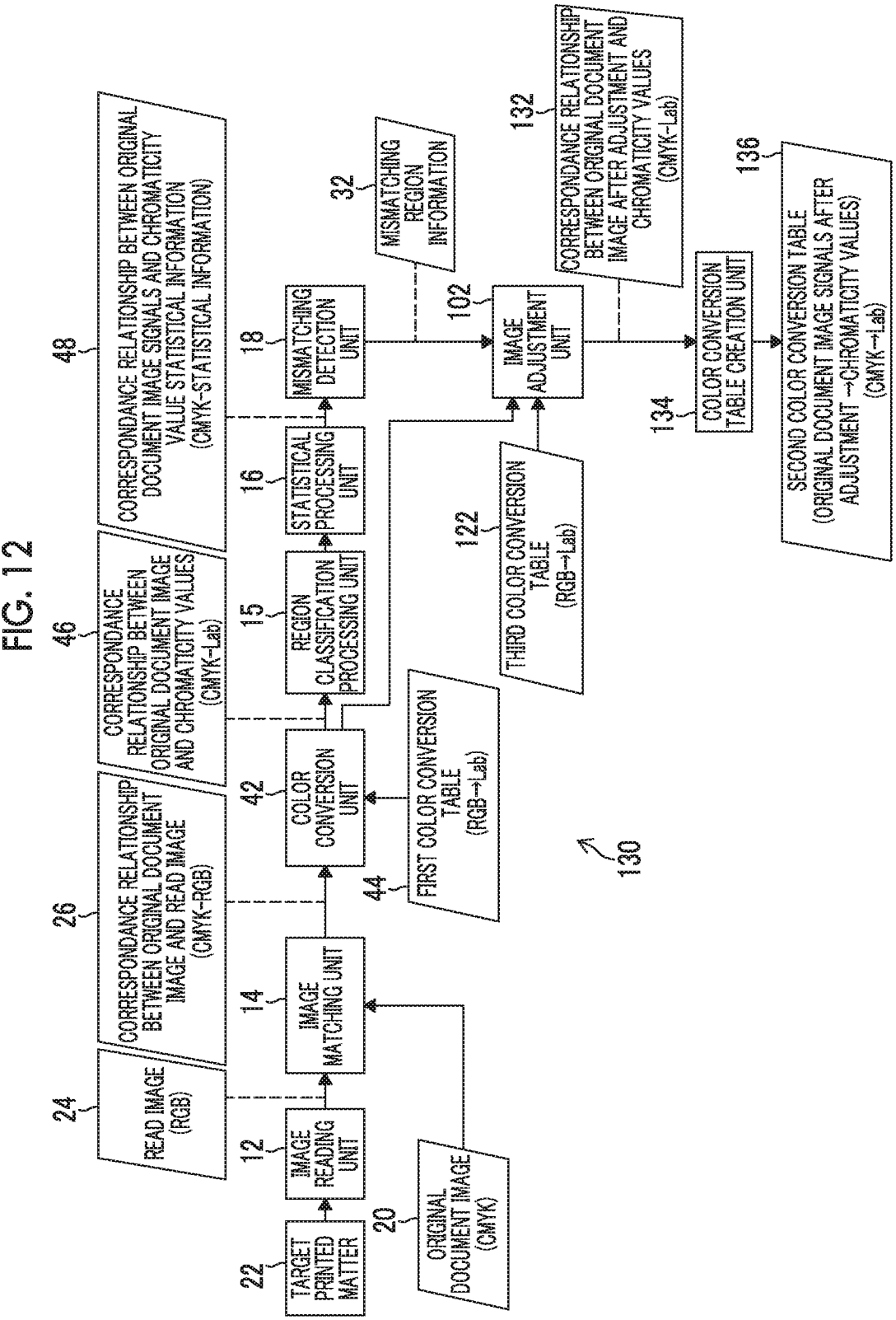
FIG. 12 is a block diagram showing a configuration of an image processing apparatus according to an eighth embodiment.

FIG. 12 is a block diagram showing a configuration of an image processing apparatus 130 according to an eighth embodiment. FIG. 12 has a configuration in which a color conversion table creation unit 134 is additionally provided in the configuration of the image processing apparatus 120 described in FIG. 11. In FIG. 12, the same reference numerals are given to the same or similar components as in the configuration shown in FIG. 11, and description thereof will not be repeated.

The color conversion table creation unit 134 in FIG. 12 creates a second color conversion table 136 (corresponding to a target profile) indicating a correspondence relationship between original document image signals (CMYK) and chromaticity values (Lab) on the basis of a correspondence relationship between an original document image after adjustment and chromaticity values.

[Color Conversion Table Creating Unit 134]

As described in FIG. 11, as the original document image 104 after adjustment is created by the image adjustment unit 102, data indicating a correspondence relationship between image signal values (in this example, CMYK values) of respective pixels in the original document image 104 after adjustment and chromaticity values (in this example, Lab values) of respective pixels in a read image of the target printed matter 22 is obtained. The data indicating the correspondence relationship between the image signal values of the original document image 104 after adjustment and the chromaticity values of the read image of the target printed matter 22 is referred to as "correspondence relationship data between original document image signals after adjustment and chromaticity values", and is indicated by reference numeral 132 in FIG. 12.

The color conversion table creation unit 134 in FIG. 12 creates the second color conversion table 136 that defines a conversion relationship (CMYK→Lab) indicating conversion from original document image signal values (CMYK) into chromaticity values (Lab) on the basis of the "correspondence relationship data 132 between original document image after adjustment and chromaticity values" created by the image adjustment unit 102.

In the printing system in the related art, in creation of such a color conversion table, generally, a correspondence relationship between image signal values that are regularly disposed in an entire color space and chromaticity values is calculated, and a color conversion table is obtained from the correspondence relationship through interpolation using a predetermined interpolation method.

On the other hand, in this embodiment, since the target printed matter 22 which is an actual reproduction target and the original document image 104 after adjustment which is original document image data are basically used, it is necessary to create a color conversion table from a correspondence relationship between image signal values that are partially and irregularly disposed in a color space and chromaticity values. Thus, it is not possible to use a technique using general interpolation in the related art. For this reason, the following method is employed. In the following description, the original document image 104 after adjustment is simply referred to as an original document image or original document image data, and an image signal of the original document image 104 after adjustment is referred to as an original document image signal.

Embodiment Method 1

Method for directly matching correspondence relationship data between original document image signals with chromaticity values in color conversion table A method for directly matching correspondence relationship data between original document image signals and chromaticity values in lattice points of a color space of a color conversion table will be described with reference to examples of FIGS. 13 and 14. Here, for ease of description, a concept of a color conversion table having two colors of C and M is shown.

Figures 13, 14:
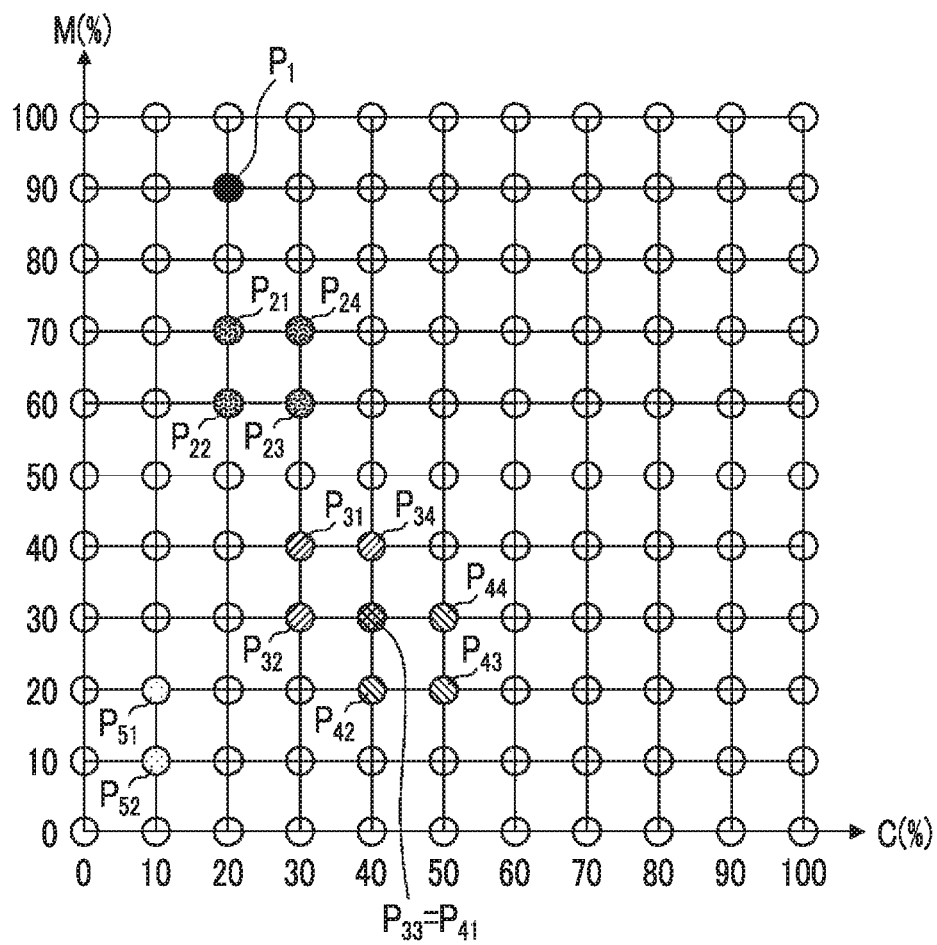
FIG. 13 is a table showing an example of correspondence data between original image signals and chromaticity values.
FIG. 14 is a diagram illustrating lattice points in a color space (here, referred to as a "CM plane") of original document image data corresponding to an input side of a color conversion table.

FIG. 13 is an example of correspondence relationship data between original document image signals (CM) and chromaticity values (Lab). FIG. 14 shows lattice points of a color space (here, CM plane) of original document image data corresponding to an input side of a color conversion table.

In FIG. 14, a range (domain, value region) of signal values to be acquired are represented by 0 to 100% on each of a C axis and an M axis, and lattice points are set in a step width of 10% on each axis. In realization of the invention, the step width of signals on each axis that define lattice points is not limited to 10%. Further, in a case where integer values (0 to 255) of 8 bits are used as signal values of image signals, a signal value "0" is set to 0% and a signal value "255" is set to 100%, and thus, it is possible to match values between 0 and 255 in a linear expression.

The lattice points with the step width of 10% shown in FIG. 14 are lattice points of original document image signals on the input side in the color conversion table. Allocation of corresponding Lab values to each lattice point corresponds to a color conversion table.

"ID" in FIG. 13 is an identification sign that specifies colors (CM values) used in the original document image data. The C value and the M value represent signal values in a range of 0 to 100%, respectively. The Lab values include values of respective components of an "L" value, an "a" value, and a "b" value.

CM values of ID=1 show that (C, M)=(20, 90) and Lab values corresponding to the CM values are (L, a, b)=(50, 60, −13).

CM values of ID=2 show that (C, M)=(24, 66) and Lab values corresponding to the CM values are (L, a, b)=(60, 36, −17).

In the creation of the color conversion table, corresponding chromaticity values (Lab values) are set with respect to lattice points of the color conversion table corresponding to original document image signal values (CM values) for each ID shown in FIG. 13.

CM values of ID=1 correspond to a color corresponding to a lattice point $P_1$ in FIG. 14. Corresponding Lab values (50, 60, −13) are set with respect to the lattice point $P_1$ corresponding to ID=1.

Since there are no directly corresponding lattice points with respect to ID=2 to 5, chromaticity values are set with respect to neighboring lattice points. As shown in FIG. 14, chromaticity values are set with respect to four neighboring lattice points that surround original document image signal values with respect to ID=2, 3, and 4.

With respect to ID=2, the same Lab values (60, 36, −17) are set with respect to four lattice points $P_{21}$, $P_{22}$, $P_{23}$, and $P_{24}$ that surround (C, M)=(24, 66). With respect to ID=3 and ID=4, similarly, chromaticity values are set with respect to four lattice points that surround original document image signal values. Here, as in ID=3 and ID=4, in a case where a part of four lattice points that surround original document image signal values is the same and there are candidates of different chromaticity values with respect to the same lattice point, chromaticity values of the candidates are averaged for setting.

That is, four lattice points that surround (C, M)=(35, 35) of ID=3 are $P_{31}$, $P_{32}$, $P_{33}$, and $P_{34}$, and four lattice points that surround (C, M)=(47, 23) of ID=4 are $P_{41}$ ($P_{33}$), $P_{42}$, $P_{43}$, and $P_{44}$. With respect to a lattice point ($P_{33}=P_{41}$) indicated by (C, M)=(40, 30), since there are a candidate (71, 9, −20) of chromaticity values of ID=3 and a candidate (72, −4, −26) of chromaticity values of ID=4, average values (71.5, 2.5, −23) of Lab values of ID=3 and ID=4 are allocated.

Lab values (71, 9, −20) of ID=3 are set with respect to the other lattice points $P_{31}$, $P_{32}$, and $P_{34}$. Further, Lab values (72, −4, −26) of ID=4 are set with respect to $P_{42}$, $P_{43}$, and $P_{44}$.

Since the C value is "10%" with respect to ID=5, "two lattice points" $P_{51}$ and $P_{52}$ are used instead of "surrounding four lattice points", and corresponding Lab values (89, 6, −8) are set with respect to the lattice points $P_{51}$ and $P_{52}$.

Since lattice points irrelevant to original document image signal values among all the lattice points of the color conversion table are not used in color conversion of the original document image 20, appropriate values are set with respect to the lattice points. With respect to lattice points indicated by white circles in FIG. 14, arbitrary values of Lab=(100, 0, 0) may be set, for example.

In FIGS. 13 and 14, for ease of description, a color conversion table of two colors of C and M is shown, but even in a color conversion table of three or more colors, chromaticity values may be set with respect to lattice points in a similar way.

In the case of two colors, lattice points that surround arbitrary CM values are four points at the maximum, but in the case of three colors, the lattice points are 8 points at the maximum, and in the case of four colors, the lattice points are 16 points at the maximum.

Further, in FIGS. 13 and 14, with respect to ID=1, the Lab values (chromaticity values) match lattice points corresponding to the CM values, but there is a possibility that slightly deviating points are referenced due to a calculation error or the like in referring to the color conversion table and interpolation calculation is performed with respect to chromaticity values of neighboring lattice points. Thus, it is preferable to set the same chromaticity values with respect to neighboring lattice points, in addition to directly corresponding lattice points.

There is no inconvenience in color-converting original document image data using a color conversion table (second color conversion table 136) created by the technique described in the [Embodiment method 1] and performing printing in a printing apparatus.

However, there may be an inconvenience in a case where an operator adjusts (corrects) original document image data for color adjustment after viewing a result printed using a color conversion table created by the technique in [Embodiment method 1]. That is, a case where there is no desired color change in a case where an operator adjusts original document image data or a case where a color change different from a change direction of a color intended by an operator occurs, may be considered, for example. In such a case, it is difficult to further perform color adjustment with respect to the original document image data.

In order to prevent inconvenience in adjustment of original document image data as described above, it is preferable that an entire color space (including a color portion irrelevant to the original document image data) becomes corresponding chromaticity values (a color close to a color conceived by an operator) and smoothness of a color change is secured. In a case where smooth continuity of the entire color space as described above can be secured, techniques as in the following Embodiment method 2, 3, or 4 may be used.

Embodiment Method 2

Method for correcting temporary color conversion table using correspondence relationship data between original document image signals and chromaticity values In Embodiment method 2, a "temporary color conversion table" in which smoothness of a color change corresponding to an entire color space is secured is prepared in advance, and the temporary color conversion table is locally (partially) corrected using a correspondence relationship data between original document image signals and chromaticity values.

Here, as the "temporary color conversion table", for example, in the case of input of CMYK, any one of color conversion tables indicating standard color reproduction in offset printing of Japan Color (registered trademark), Specifications Web Offset Printing (SWOP), General Requirements for Applications in Commercial Offset Lithography (GRACoL), Fogra, and the like may be used, and in the case of input of RGB, any one of color conversion tables such as sRGB, AdobeRGB, and the like may be used.

Further, the above-mentioned standard color conversion table and the color conversion tables created by the technique in Embodiment method 2 in the past are stored in a database, a color conversion table that is closest to correspondence relationship data between original document image signals and chromaticity values, newly acquired from a current read image of the target printed matter 22 and the original document image 20, is selected from the database, and the selected color conversion table may be used as the "temporary color conversion table".

In selecting the color conversion table that is closest to the "correspondence relationship data between original document image signals and chromaticity values", a color conversion table in which an average value of color differences with respect to correspondence relationship data between original document image signals and chromaticity values is the smallest, a color conversion table in which a maximum value of color differences with respect to correspondence relationship data between original document image signals and chromaticity values is the smallest, or the like may be automatically extracted from the database and may be set as the "temporary color conversion table". In a case where a plurality of candidates of the "temporary color conversion tables" are extracted through the automatic extraction, a configuration in which the candidates are displayed on a display unit (reference numeral 234 in FIG. 16) and are selected by a user may be used.

Setting of chromaticity values with respect to lattice points described in [Example 1] is performed with respect to the "temporary color conversion table". Namely, chromaticity values are set with respect to the lattice points $P_1$, $P_{21}$ to $P_{24}$, $P_{31}$ to $P_{34}$, $P_{41}$ to $P_{44}$, and $P_{51}$ to $P_{52}$ (see FIG. 14) corresponding to ID=1 to 5 described in FIG. 13 in a similar way to Embodiment method 1, and the temporary color conversion table is corrected so that the chromaticity values with respect to the lattice points indicated by the white circles in FIG. 14 become the values of the "temporary color conversion table".

In the color conversion table after correction obtained in this way, since chromaticity values of lattice points are locally exchanged with respect to the temporary color conversion table, it is expected that continuity (smoothness) of chromaticity values becomes poor between lattice points in which chromaticity values are exchanged and lattice points in which chromaticity values are not exchanged. Thus, it is preferable to further perform a smoothing process with respect to a color conversion table after correction and to secure smoothness of conversion of chromaticity values.

Embodiment Example 3

Method using color reproduction mode

As a color reproduction model, for example, a Neugebauer model may be used. The Neugebauer model is a model in which chromaticity values of mixed colors of 0% and 100% of respective color materials (primary colors) are added according to area ratios of the respective color materials to calculate chromaticity values of reproduction colors due to mixture of arbitrary area ratios of the respective color materials. In the Neugebauer model, generally, XYZ values are used as the "chromaticity values.

Figure 15:
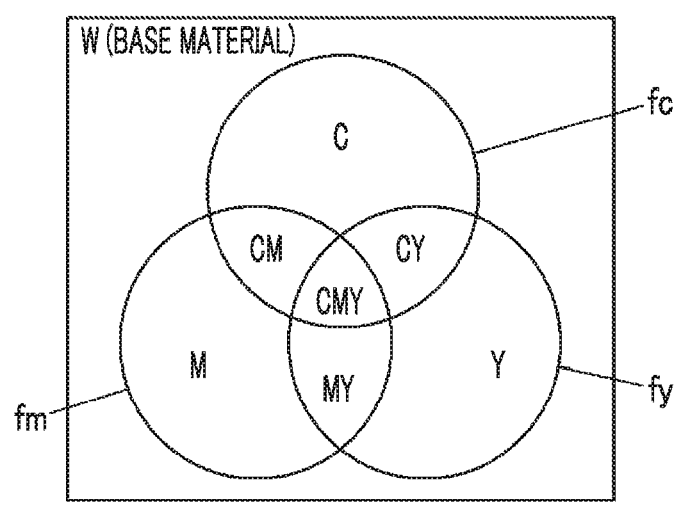
FIG. 15 is a diagram illustrating a method for calculating chromaticity values based on a Neugebauer model.

Here, a color reproduction model will be described using an example of three color materials of CMY with reference to FIG. 15. In a case where CMY area ratios of a prediction target color are represented as (fc, fm, fy), area ratios Fi (i=w, c, m, y, cm, my, yc, cmy) of mixture of 0% and 100% of respective color materials may be calculated according to the following expression. Here, "·" in the following description represents multiplication.

$Fw=(1-fc)\cdot(1-fm)\cdot(1-fy)$ $Fc=fc\cdot(1-fm)\cdot(1-fy)$ $Fm=(1-fc)\cdot fm\cdot(1-fy)$ $Fy=(1-fc)\cdot(1-fm)\cdot fy$ $Fcm=fc\cdot fm\cdot(1-fy)$ $Fmy=(1-fc)\cdot fm\cdot fy$  $Fyc=fc\cdot(1-fm)\cdot fy$ $Fcmy=fc\cdot fm\cdot fy$ Here, "w" represents a base material (printing base material) of a printed matter such as a printing sheet. The area ratio represents a coverage factor per unit area on the printing base material. Here, the area ratio is represented as a value of 0 or greater and 1 or smaller. Further, fc, fm, and fy are values recognized from signal values (image signal values) of image data.

In a case where a chromaticity value (for example, X of the XYZ values) of mixture of 0% and 100% of each color material is represented as Xpi (i=w, c, m, y, cm, my, yc, cmy), the chromaticity value X with respect to the CMY area ratios (fc, fm, fy) may be calculated according to the following expression.

$$X = \sum_i F_i \cdot Xp_i \qquad \text{Expression 3}$$

X and Z values among the XYZ values may be calculated in a similar way, and conversion from the XYZ values into Lab values may be simply performed. Further, the same method may be applied to printing of two colors or printing of four or more colors other than printing of three colors.

In order to use the Neugebauer model in the creation of a color conversion table, chromaticity values of mixture of 0% and 100% of respective color materials are required.

However, in this embodiment, since an actual printed matter (target printed matter 22) other than a color chart is basically used, a mixed color of 0% and 100% of each color material is not necessarily present in a correspondence relationship between image signal values (CMYK) recognized from reading of the target printed matter 22 and chromaticity values (XYZ) of the target printed matter 22.

Thus, it may be considered that (Xpi, Ypi, Zpi) are estimated by an optimal technique using chromaticity values (Xpi, Ypi, Zpi) corresponding to mixture of 0% and 100% of respective color materials of the Neugebauer model as unknown numbers and using a correspondence relationship between image signal values (CMYK), that is, "Fi" and chromaticity values (Xm, Ym, Zm) of a target printed matter as correct answer data. That is, optimization for searching (Xpi, Ypi, Zpi) that minimize a square sum of differences shown in the following expression is performed.

The following expression is an expression that relates to X. This is similarly applied to expressions that relate to Y and Z.

$$\sum_j \left\{ \left( \sum_i F_{ij} \cdot Xp_i \right) - Xm_i \right\}^2 \rightarrow \min \qquad \text{Expression 4}$$

Here, j is a suffix that means an ID (that is, each pixel) of correspondence relationship data between image signal values (CMYK) and chromaticity values (XmYmZm) of a target printed matter.

As the optimization technique, a Newton method, a quasi-Newton method, a Simplex method, or the like may be used, for example. Techniques other than the above-mentioned methods may be used. That is, application techniques are not particularly limited.

By using (Xpi, Ypi, Zpi) calculated by the optimization, it is possible to calculate chromaticity values of each lattice point of a color conversion table by the Neugebauer model.

In this way, (Xpi, Ypi, Zpi) are estimated by the optimization calculation, but in a case where there is a mixed color of 0% and 100% of color materials in image signals, corresponding chromaticity values may be employed as the values of (Xpi, Ypi, Zpi) as they are. Thus, the number of unknown numbers is reduced, and the optimization becomes easy.

Further, in the above description, the Neugebauer model is used, but a Yule-Nielsen correction Neugebauer model of the following expression may also be used. Here, n is a so-called Yule-Nielsen correction coefficient, which corrects nonlinearity of mixture with respect to the Neugebauer model.

$$X = \sum_i \{F_i \cdot Xp_i^{1/n}\}^n \qquad \text{Expression 5}$$

In a case where the model with this correction coefficient is used, n may be added to unknown numbers to perform optimization. n may be common to XYZ values, or may be calculated as different coefficients (nx, ny, nz) in X, Y, and Z.

Further, a Cellular-Neugebauer model in which a color (Xpi, Ypi, Zpi) which is a basis of color prediction is expanded to a mixed color (for example, 0%, 40%, 100%) including an intermediate area ratio may be used, for example. In addition, in the realization of the invention, the invention is not limited to the Neugebauer model. A color reproduction model other than the Neugebauer model may be used as long as it is a model indicating a relationship between image signals and chromaticity values. Further, by enciphering color reproduction (a relationship between image signals and chromaticity values) using an appropriate matrix, a polynomial expression, or the like and optimizing elements of the matrix, coefficients of the polynomial expression, or the like, it is possible to create a new model.

<Image Processing Method>

Content of processes and a procedure in each of the image processing apparatuses 10, 40, 50, 90, 100, 110, 120, and 130 described in the first embodiment to the eighth embodiment may be recognized as each image processing method.

<Configuration Example of Printing System>

Figure 16:
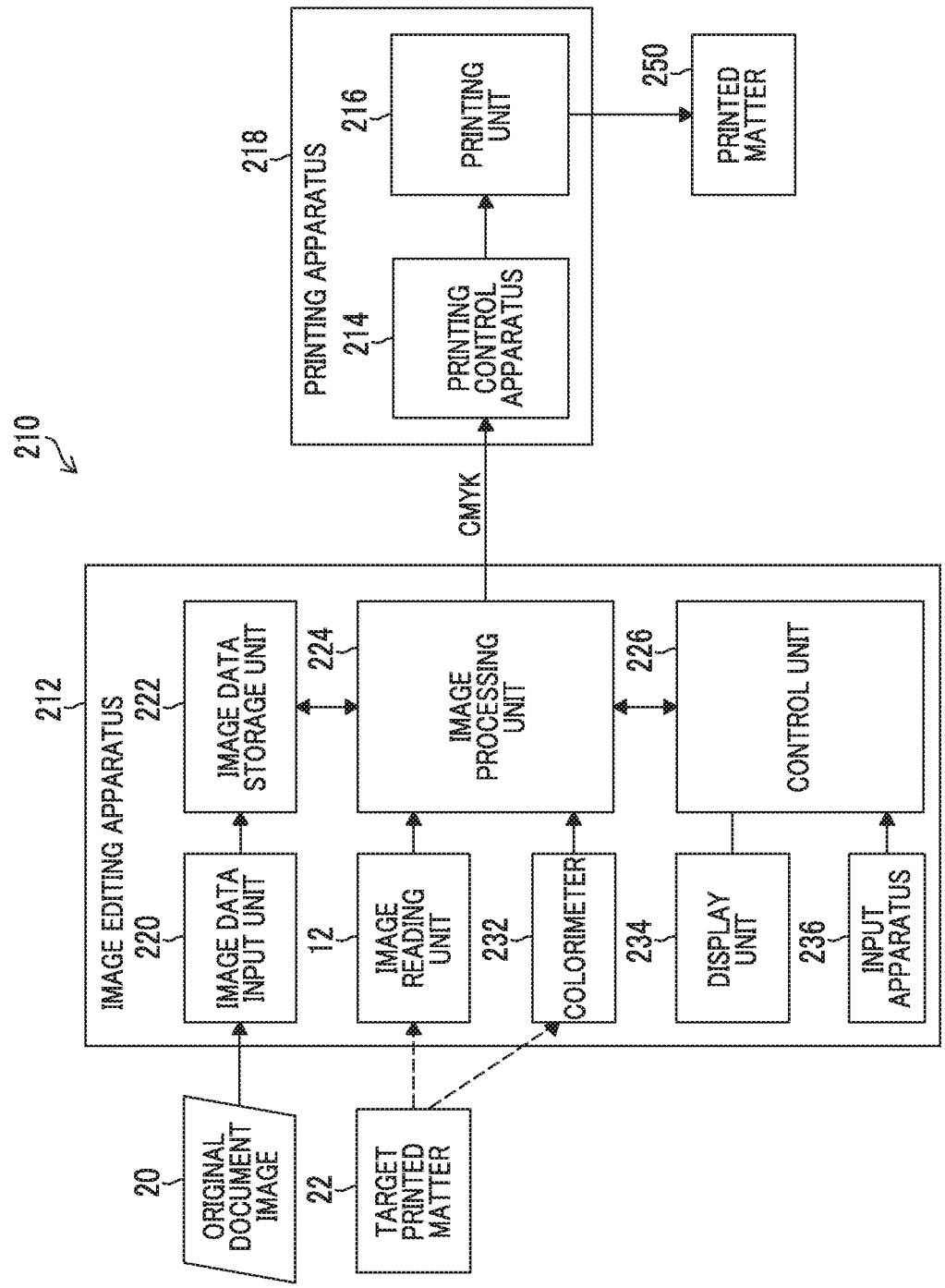
FIG. 16 is a block diagram showing a configuration example of a printing system including the image processing apparatus according to the embodiments of the invention.

FIG. 16 is a block diagram showing a configuration example of a printing system including an image processing apparatus according to an embodiment of the invention. A printing system 210 includes an image editing apparatus 212, a printing control apparatus 214, and a printing unit 216. The image editing apparatus 212 serves as an image processing apparatus according to an embodiment. The image editing apparatus 212 functions as the image processing apparatus described in each embodiment of the first embodiment to the eighth embodiment. That is, the image editing apparatus 212 is an apparatus that functions as an image inspection apparatus that detects color mismatching between an original document image 20 and a target printed matter 22, and performs a color conversion process using a color conversion table or image processing such as image data processing (editing). Printing image data generated in the image editing apparatus 212 is transmitted to the printing control apparatus 214.

The printing control apparatus 214 controls a printing operation of the printing unit 216 on the basis of printing image data generated by the image editing apparatus 212. The printing control apparatus 214 may include a halftone processing unit that converts continuous tone image data into binary or multi halftone dot image data. In this embodiment, a configuration in which the image editing apparatus 212 and the printing control apparatus 214 are separately provided is shown, but a configuration in which the function of the printing control apparatus 214 is installed in the image editing apparatus 212 may be used. For example, a configuration in which one computer functions as the image editing apparatus 212 and the printing control apparatus 214 may be used.

The printing unit 216 is image formation means for performing printing under the control of the printing control apparatus 214. A printing method in the printing unit 216 and the kinds of color materials to be used are not particularly limited. The printing unit 216 may employ a variety of printers such as an inkjet printer, an electrophotographic printer, a laser printer, an offset printer, or a flexo printer, for example. The term "printer" is understood as a term having the same meaning as that of a term such as a printer, a printing apparatus, an image recording apparatus, an image formation apparatus, an image output apparatus, or the like. As the color materials, ink, toner, or the like may be used according to the type of the printing unit 216.

Here, for ease of description, a plateless digital printer is assumed, and a configuration in which the printing control apparatus 214 and the printing unit 216 are combined is written as the printing apparatus 218. A form in which the printing control apparatus 214 and the printing unit 216 are integrally combined to form the printing apparatus 218 may be used, or a form in which the printing control apparatus 214 and the printing unit 216 are provided as separate apparatuses to perform delivering of signals through wired or wireless communication connection may also be used.

In a case where a plate printer using a printing plate is used as the printing unit 216, a system configuration in which a plate manufacturing apparatus (not shown) such as a plate recorder that creates a printing plate from image data is provided in addition to the printing control apparatus 214 is used. In this case, a configuration in which the plate manufacturing apparatus (not shown), the printing control apparatus 214, and the printing unit 216 are combined corresponds to the printing apparatus 218.

The printing system 210 in this example uses an inkjet printer capable of forming a color image using ink of four colors of cyan (C), magenta (M), yellow (Y), and black (K), as an example of the printing apparatus 218, for example. Here, the number of ink colors and combinations thereof are not limited to this example. For example, a form in which dyeing ink such as light cyan (LC) or light magenta (LM) in addition to four colors of CMYK is additionally used, a form in which specific ink such as red or green is used may be used.

The image editing apparatus 212 includes an image data input unit 220, an image data storage unit 222, an image processing unit 224, and a control unit 226. The image editing apparatus 212 includes an image reading unit 12, a colorimeter 232, a display unit 234, and an input device 236. The image editing apparatus 212 may be realized by a combination of hardware and software of a computer. Specifically, as a variety of programs is loaded into a central processing unit (CPU, not shown), the CPU operates, and the image data input unit 220, the image data storage unit 222, the image processing unit 224, and the control unit 226 in the image editing apparatus 212 are controlled. The software has the same meaning as that of the program. The image editing apparatus 212 may be realized as one function of a Raster Image Processor (RIP).

The image data input unit 220 is a data acquisition unit for importing the original document image 20. The image data input unit 220 may be configured by a data input terminal that imports the original document image 20 from the outside or another signal processing unit inside the apparatus. As the image data input unit 220, a wired or wireless communication interface unit may be employed, a media interface unit that performs reading and writing with respect to an external storage medium such as a memory card may be employed, or an appropriate combination thereof may be used.

The image data storage unit 222 is means for storing the original document image 20 acquired through the image data input unit 220. The original document image 20 acquired from the image data input unit 220 is stored in the image data storage unit 222.

The image reading unit 12 reads the target printed matter 22 or a printed matter such as the printed matter 250 printed by the printing apparatus 218 to generate read image data of the read target. A function of importing the read image data obtained by the image reading unit 12 to the image processing unit 224 corresponds to a "function of acquiring read image data".

The image processing unit 224 performs a process of detecting color mismatching between the original document image 20 and the target printed matter 22 on the basis of read image data acquired from the image reading unit 12 and the original document image 20. Further, the image processing unit 224 may perform a process of adjusting image signal values of the original document image 20 in which mismatching is detected to create an original document image 104 after adjustment (see FIG. 11). Further, the image processing unit 224 may perform a process of creating a color conversion table (the second color conversion table 136 described in FIG. 12) necessary for color reproduction based on the printing unit 216.

The image processing unit 224 has a function of performing a color conversion process with respect to the original document image 20 or the original document image 104 after adjustment (see FIG. 11) using a color conversion table of a target profile, and generating image data to be delivered to the printing apparatus 218. The image processing unit 224 includes a function of performing a process such as resolution conversion or gradation conversion with respect to the original document image 20 or the read image data, as necessary.

Further, the printing system 210 of this example includes the colorimeter 232 in order to enhance the accuracy of color information of read image from the image reading unit 12. A spectral colorimeter may be used as the colorimeter 232. The spectral colorimeter measures a reflectivity of a wavelength region of visible light with a predetermined wavelength pitch width, and calculates XYZ values using a color function of XYZ or the like indicating a spectral sensitivity of the sense of vision to acquire colorimetric values. The spectral colorimeter used as the colorimeter 232 measures a reflectivity of a wavelength region of 380 nm to 730 nm which is a wavelength region of visible light with a wavelength pitch width (wavelength step) of 10 nm, and obtains colorimetric values. The XYZ values obtained from the colorimeter 232 may be converted into color coordinate values of a device non-dependent color space such as an L*a*b* color system by a known conversion expression. The colorimeter 232 is a form of color measurement means (color measurement unit).

Information on colorimetric values obtained from the colorimeter 232 is transmitted to the image processing unit 224. The image processing unit 224 may create a color conversion table in consideration of the information on the colorimetric values acquired from the colorimeter 232 in addition to the read image data obtained from the image reading unit 12.

The control unit 226 controls operations of respective units of the image editing apparatus 212. The display unit 234 and the input device 236 function as a user interface. The input device 236 may employ a variety of means such as a keyboard, a mouse, a touch panel, or a track ball, and may employ an appropriate combination thereof. A configuration in which the display unit 234 and the input device 236 are integrally formed, for example, a configuration in which a touch panel is disposed on a screen of the display unit 234 may be used.

An operator may perform input of a variety of information such as input of printing conditions, selection of an image quality mode, input or editing of attachment information, retrieval of information, or the like using the input device 236 while viewing contents displayed on the screen of the display unit 234. Further, input content and a variety of other information may be confirmed through display of the display unit 234.

The display unit 234 functions as inform means for informing error information. In a case where color mismatching between the original document image 20 and the target printed matter 22 is detected, information for informing the mismatching is displayed on the screen of the display unit 234.

Figure 17:
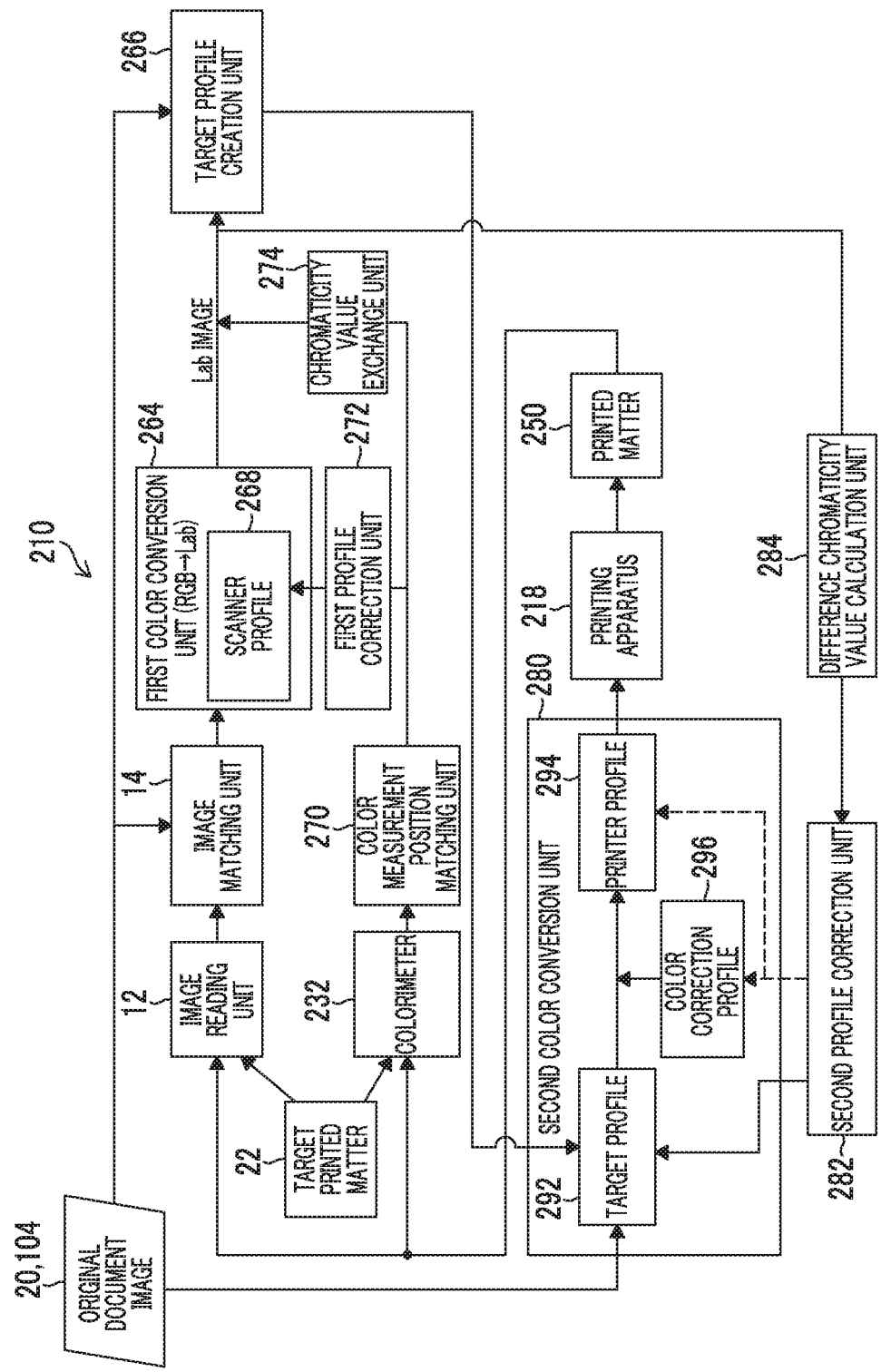
FIG. 17 is a block diagram showing an outline of a creation function of a target profile in a printing system and a printing function thereof.

FIG. 17 is a block diagram showing an outline of a creation function and a printing function of a target profile in the printing system 210. In FIG. 17, the same reference numerals are given to the same components as those described in FIG. 16. The printing system 210 includes a function of performing color matching so that the printed matter 250 on which the same color as that of the target printed matter 22 is reproduced is obtained by the printing apparatus 218, on the basis of the given target printed matter 22 and the original document image 20. The "same color" includes an allowable range capable of being satisfied as the substantially same color in a color difference range that is allowable by a client.

In order to realize the color matching, the printing system 210 includes the image reading unit 12, and as shown in FIG. 17, includes the image matching unit 14, a first color conversion unit 264, and a target profile creation unit 266.

The first color conversion unit 264 corresponds to the color conversion unit 42 described in FIG. 3. The first color conversion unit 264 performs a process of converting read image data indicated by signal values (in this example, RGB) of color components of a device dependent color space into read image data after color conversion indicated by signal values (in this example, Lab) of color components of a device non-dependent color space. The first color conversion unit 264 performs a color conversion process (RGB→Lab conversion) of converting RGB values into Lab values using a color conversion table (corresponding to the first color conversion table 44 described in FIG. 3) of a scanner profile 268. The scanner profile 268 includes a color conversion table ("first color conversion table") indicating a correspondence relationship between RGB values which are read image signal values of a device dependent color space obtained from the image reading unit 12 and Lab values of a device non-dependent color space.

Signal values of a read image before color conversion in the first color conversion unit 264 are "scan RGB values", and signal values of a read image after color conversion in the first color conversion unit 264 are "scan Lab values".

In this embodiment, the Lab color space is used as the device non-dependent color space, but another device non-dependent color space may be used. In a case where a color space of read image signals (RGB) obtained from the image reading unit 12 is referred to as a "first color space" and a device non-dependent color space exemplified by the Lab color space is referred to as a "second color space, the first color conversion unit 264 performs a process of converting signal values indicated by the first color space into signal values indicated by the second color space.

The target profile creation unit 266 corresponds to the color conversion table creation unit 134 described in FIG. 12. The target profile creation unit 266 creates a color conversion table (corresponding to the "second color conversion table") of a target profile from a correspondence relationship between the original document image 20 or the original document image 104 after adjustment (see FIG. 11) and a read image indicated by chromaticity values.

Further, the printing system 210 includes a colorimetric position matching unit 270 that performs a process of matching a colorimetric position at which colorimetric values are obtained by the colorimeter 232 with a position in the original document image 20, and a first profile correction unit 272 that corrects the scanner profile 268 using the colorimetric values obtained from the colorimeter 232. A configuration in which a chromaticity value switching unit 274 that directly corrects chromaticity values of an Lab image after color conversion in the first color conversion unit 264 is provided instead of the first profile correction unit 272 or in addition to the first profile correction unit 272 may be used.

The respective units of the image matching unit 14, the first color conversion unit 264, the target profile creation unit 266, the colorimetric position matching unit 270, the first profile correction unit 272, and the chromaticity value exchange unit 274 are included in the image processing unit 224 of the image editing apparatus 212 described in FIG. 16.

Further, as shown in FIG. 17, the image processing unit 224 includes a second color conversion unit 280, a second profile correction unit 282, and a difference chromaticity value calculation unit 284.

The second color conversion unit 280 performs a color conversion process with respect to the original document image 20 or the original document image 104 after adjustment obtained by partially adjusting image signal values of the original document image 20. The second color conversion unit 280 performs the color conversion process with respect to the original document image 20 or the original document image 104 after adjustment using a target profile 292 based on a format of ICC profile and a printer profile 294 to generate image signals of a data format suitable for the printing apparatus 218. Here, as the image signals of the data format suitable for the printing apparatus 218, output device signals based on a format of CMYK signals are generated.

A color conversion table (referred to as an "input color conversion table") of the target profile 292 is a color conversion table in which target colors of original document image signals are defined in a device non-dependent color space. In the case of this example, a color conversion table (corresponding to the "second color conversion table") of the target profile 292 is a table in which a conversion relationship of CMYK→Lab is written. In a case where a color space of original document image signals is referred to as a third color space, the input color conversion table is a table that determines a conversion relationship from signal values indicated in the third color space into signal values indicated in the device non-dependent second color space.

The printer profile 294 is also referred to as an output profile. A color conversion table (referred to as an "output color conversion table") of the printer profile 294 is a color conversion table that defines a correspondence relationship between CMYK signals to be output to the printing apparatus 218 and Lab values of output colors from the printing apparatus 218. The output color conversion table is a table in which a relationship (Lab→CMYK) of conversion to output CMYK values corresponding to Lab values to be reproduced is written.

The difference chromaticity value calculation unit 284 is a calculation unit that calculates difference chromaticity values (Lab difference) indicating a difference between target chromaticity values (Lab values of the target printed matter 22) created by color conversion from read image data of the target printed matter 22 using the first color conversion unit 264 and printing chromaticity values (Lab values of the printed matter 250) generated from read image data of the printed matter 250.

Difference information calculated by the chromaticity value calculation unit 284 is provided to the second profile correction unit 282. The second profile correction unit 282 performs a process of correcting the target profile 292 on the basis of the difference information. The second profile correction unit 282 is not limited to the configuration in which the target profile 292 is corrected, and may employ a configuration in which a printer profile 294 is corrected. Alternatively, the second profile correction unit 282 is configured to create a color correction profile 296 on the basis of the difference information and to combine the target profile 292, the color correction profile 296, and the printer profile 294 to correct a color conversion table of the second color conversion unit 280.

A color adjustment operation for performing color matching between the target printed matter 22 and the printed matter 250 using the image reading unit 12 in the printing system 210 of this embodiment may be generally divided into the following two steps.

The first step is to estimate a target profile by reading the target printed matter 22 using the image reading unit 12, that is, to create the target profile.

The second step is to read each of the target printed matter 22 and the printed matter 250 printed by the printing apparatus 218 using the image reading unit 12 and to correct a profile to be applied to the second color conversion unit 280 on the basis of the reading result to enhance the accuracy of color matching.

According to the color adjustment technique provided in the printing system 210, the following advantages are obtained.

[1] Since a color conversion table of a target profile can be created from a correspondence relationship between a read image of a target printed matter and an original document image, it is possible to simplify a target profile creation operation.

[2] Further, it is possible to correct a provisional input color conversion table, to correct an output color conversion table, or to create a color correction table on the basis of chromaticity values of a target printed matter acquired by reading the target printed matter 22 using the image reading unit 12 and chromaticity values of a printed matter acquired by reading a printed matter printed through color conversion using a temporary input color conversion table using the image reading unit 12. Thus, it is possible to make a color conversion table to be applied to the second color conversion unit 280 more appropriate, to thereby enhance the accuracy of color conversion. Further, by repeating such processes, it is possible to make colors of the printed matter closer to colors of the target printed matter 22.

[3] By using a color conversion table created by the target profile creation unit 266 as a first initial input color conversion table of a "temporary input color conversion table", the accuracy of color reproduction in first printing is optimized, and thus, convergence of color matching becomes faster.

[4] According to this embodiment, since a color conversion table (second color conversion table) indicating a multi-dimensional correspondence relationship of chromaticity values corresponding to original document image signal values is created to perform color matching between a target printed matter and a printed matter, it is possible to enhance the degree of freedom in color correction, and to perform color correction (color matching) with high accuracy, compared with a related art method. According to this embodiment, even in a case where color reproduction features of a printer that outputs a target printed matter and the printing apparatus 218 used for printing of the printed matter 250 are greatly different from each other, sufficient color matching accuracy is obtained.

[5] By employing the image matching unit 14 including the original document correspondence image extraction unit 70 described in FIG. 7, it is possible to detect mismatching or to perform color matching even in a case where the original document image 20 and the printing image of the target printed matter 22 do not match each other in one-to-one correspondence.

[6] By employing a configuration in which the colorimeter 232 is used, it is possible to reduce a measurement error of chromaticity values acquired through the image reading unit 12, to thereby enhance the accuracy of color matching.

[7] According to this embodiment, even in a case where a color reproduction target is designated by an actual printed matter (target printed matter), it is possible to create an appropriate color conversion table, and to perform color management using an ICC profile.

<Program that Causes Computer to Function as Image Processing Apparatus>

A program that causes a computer to function as the image processing apparatus described in the above-described embodiment may be recorded on a compact disc read-only memory (CD-ROM), a magnetic disc, or another computer-readable medium (a non-transitory information storage medium which is a tangible object), and the program may be provided through the information storage medium. Instead of a form in which the program is recorded on such an information storage medium to be provided, it is also possible to provide a program signal as download service using a communication network such as the Internet.

By assembling such a program in a computer, it is possible to cause the computer to realize the respective functions of the image processing apparatus, and to realize the mismatching detection function, the original document image adjustment function, the color conversion table creation function, and the color conversion processing function described in the above-described embodiments.

The functions of the image processing apparatus described in the respective embodiments may be realized by a single computer, or may be realized by a plurality of computers. Further, in a case where the functions of the image processing apparatus are realized by the plurality of computers, a variety of forms for achieving of roles or functions of the respective computers may be used.

Effects of Embodiments (1) According to the above-described embodiments of the invention, it is possible to detect mismatching of a color of a target printed matter in the same image signal value image region of an original document image.

(2) It is possible to make a color matching process with respect to a target printed matter efficient using detected mismatching information, and to reduce a working time for color adjustment.

(3) As described in FIGS. 9 to 12, in a case where mismatching is detected, by employing a configuration in which image signal values in a mismatching region in an original document image are adjusted, even in a case where a mismatched original document image is provided, it is possible to apply a technique that reads a target printed matter which is a printed matter of target color reproduction to create a target profile. Thus, even in the case of a target printed matter which does not match an original document image, it is possible to perform color matching between the target printed matter and a printed matter.

The above-described embodiments of the invention may have appropriate modifications, additions, or deletions of the components in a range without departing from the concept of the invention. The invention is not limited to the above-described embodiments, and a variety of modifications may be made those skilled in the art within a technical scope of the invention.

EXPLANATION OF REFERENCES

10: image processing apparatus
12: image reading unit
14: image matching unit
15: region classification processing unit
16: statistical processing unit
18: mismatching detection unit
20: original document image
22: target printed matter
24: read image
24A: first read image
24B: second read image
24C: read image
30: mismatching determination information
32: mismatching region information
40: image processing apparatus
42: color conversion unit
44: first color conversion table
50, 90, 100: image processing apparatus
102: image adjustment unit
104: original document image after adjustment
110, 120, 130: image processing apparatus
134: color conversion table creation unit
136: second color conversion table
210: printing system
212: image editing apparatus
214: printing control apparatus
216: printing unit
218: printing apparatus
224: image processing unit
226: control unit
264: first color conversion unit
266: target profile creation unit
280: second color conversion unit
292: target profile
294: printer profile

What is claimed is:
1. An image processing apparatus comprising:
an image reading unit that reads a target printed matter to acquire first read image data indicating a read image of the target printed matter;
an image matching unit that performs a process of matching a positional relationship between read image data which is any one of the first read image data and second read image data obtained by color conversion of the first read image data and original document image data of the target printed matter;
a statistical processing unit that generates statistical information that reflects a distribution of read image signal values of the read image data in each image region of the read image data corresponding to an image region having the same original document image signal values in the original document image data; and
a mismatching detection unit that detects color mismatching between the original document image data and the target printed matter on the basis of the statistical information.

2. The image processing apparatus according to claim 1, further comprising:
a region classification processing unit that performs a process of classifying respective pixels of the original document image data into groups of pixels having the same original document image signal values on the basis of original document image signal values of the respective pixels of the original document image data to divide the original document image data into image regions having the same original document image signal values.

3. The image processing apparatus according to claim 1, wherein the statistical processing unit performs a statistical process using a pixel group of the read image data that belongs to the image region of the read image data corresponding to the image region having the same original document image signal values as a population to generate the statistical information of at least one of a statistic indicating scattering of the read image signal values of pixels that belong to the population or a histogram of the read image signal values.

4. The image processing apparatus according to claim 2, wherein the statistical processing unit performs a statistical process using a pixel group of the read image data that belongs to the image region of the read image data corresponding to the image region having the same original document image signal values as a population to generate the statistical information of at least one of a statistic indicating scattering of the read image signal values of pixels that belong to the population or a histogram of the read image signal values.

5. The image processing apparatus according to claim 1, further comprising:
a color conversion unit that converts, using a first color conversion table indicating a correspondence relationship between read image signal values of the first read image data acquired by the image reading unit and chromaticity values indicated by values in a device non-dependent color space, the read image signal values of the first read image data into the chromaticity values,
wherein the statistical processing unit generates the statistical information using chromaticity values of the read image color-converted by the color conversion unit as the read image signal values.

6. The image processing apparatus according to claim 2, further comprising:
a color conversion unit that converts, using a first color conversion table indicating a correspondence relationship between read image signal values of the first read image data acquired by the image reading unit and chromaticity values indicated by values in a device non-dependent color space, the read image signal values of the first read image data into the chromaticity values,
wherein the statistical processing unit generates the statistical information using chromaticity values of the read image color-converted by the color conversion unit as the read image signal values.

7. The image processing apparatus according to claim 3, further comprising:
a color conversion unit that converts, using a first color conversion table indicating a correspondence relationship between read image signal values of the first read image data acquired by the image reading unit and chromaticity values indicated by values in a device non-dependent color space, the read image signal values of the first read image data into the chromaticity values,
wherein the statistical processing unit generates the statistical information using chromaticity values of the read image color-converted by the color conversion unit as the read image signal values.

8. The image processing apparatus according to claim 4, further comprising:
a color conversion unit that converts, using a first color conversion table indicating a correspondence relationship between read image signal values of the first read image data acquired by the image reading unit and chromaticity values indicated by values in a device non-dependent color space, the read image signal values of the first read image data into the chromaticity values,
wherein the statistical processing unit generates the statistical information using chromaticity values of the read image color-converted by the color conversion unit as the read image signal values.

9. The image processing apparatus according to claim 1, wherein the mismatching detection unit detects a mismatching region between colors of the original document image data and the read image data on the basis of the statistical information.

10. The image processing apparatus according to claim 2, wherein the mismatching detection unit detects a mismatching region between colors of the original document image data and the read image data on the basis of the statistical information.

11. The image processing apparatus according to claim 3, wherein the mismatching detection unit detects a mismatching region between colors of the original document image data and the read image data on the basis of the statistical information.

12. The image processing apparatus according to claim 9, further comprising:
an image adjustment unit that adjusts original document image signal values of pixels that belong to the mismatching region in the original document image data on the basis of read image signal values of pixels that belong to the mismatching region of the read image data.

13. The image processing apparatus according to claim 10, further comprising:
an image adjustment unit that adjusts original document image signal values of pixels that belong to the mismatching region in the original document image data on the basis of read image signal values of pixels that belong to the mismatching region of the read image data.

14. The image processing apparatus according to claim 12,
wherein the image adjustment unit converts the read image signal values of the pixels that belong to the mismatching region of the read image data into signal values based on a color space of the original document image data, and calculates the amount of adjustment on the basis of a difference between the signal values obtained by converting the read image signal values of the pixels that belong to the mismatching region into the color space of the original document image data and representative values of signal value groups in the mismatching region.

15. The image processing apparatus according to claim 13,
wherein the image adjustment unit converts the read image signal values of the pixels that belong to the mismatching region of the read image data into signal values based on a color space of the original document image data, and calculates the amount of adjustment on the basis of a difference between the signal values obtained by converting the read image signal values of the pixels that belong to the mismatching region into the color space of the original document image data and representative values of signal value groups in the mismatching region.

16. The image processing apparatus according to claim 14,
wherein the image adjustment unit adds the amount of adjustment to the original document image signal values of the pixels that belong to the mismatching region in the original document image data to calculate original document image signal values after adjustment.

17. The image processing apparatus according to claim 15,
wherein the image adjustment unit adds the amount of adjustment to the original document image signal values of the pixels that belong to the mismatching region in the original document image data to calculate original document image signal values after adjustment.

18. The image processing apparatus according to claim 12, further comprising:
a color conversion table creation unit that creates, on the basis of a correspondence relationship between original document image data after adjustment obtained by adjusting the original document image signal values by the image adjustment unit and the second read image data obtained by converting the read image signal values of the first read image data into chromaticity values indicated by values in a device non-dependent color space, a second color conversion table indicating a correspondence relationship between the original document image signal values based on a color space of the original document image data and the chromaticity values.

19. An image processing method comprising:
an image reading step of reading a target printed matter to acquire first read image data indicating a read image of the target printed matter;
an image matching step of performing a process of matching a positional relationship between read image data which is the first read image data or second read image data obtained by color conversion of the first read image data and original document image data of the target printed matter;
a statistical processing step of generating statistical information that reflects a distribution of read image signal values of the read image data in each image region of the read image data corresponding to an image region having the same original document image signal values in the original document image data; and
a mismatching detection step of detecting color mismatching between the original document image data and the target printed matter on the basis of the statistical information.

20. A non-transitory computer recording medium storing a program that causes a computer to realize:
a function of acquiring, using an image reading unit that reads a target printed matter, first read image data indicating a read image of the target printed matter;
an image matching function of performing a process of matching a positional relationship between read image data which is the first read image data or second read image data obtained by color conversion of the first read image data and original document image data of the target printed matter;
a statistical processing function of generating statistical information that reflects a distribution of read image signal values of the read image data in each image region of the read image data corresponding to an image region having the same original document image signal values in the original document image data; and
a mismatching detection function of detecting color mismatching between the original document image data and the target printed matter on the basis of the statistical information.

* * * * *